United States Patent
Yhdego

(10) Patent No.: US 12,517,645 B1
(45) Date of Patent: Jan. 6, 2026

(54) GESTURE-BASED MULTI-DRAFT MANAGEMENT SYSTEM FOR MESSAGING APPLICATIONS

(71) Applicant: Florida A&M University, Tallahassee, FL (US)

(72) Inventor: Tsegai Okbay Yhdego, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 0 days.

(21) Appl. No.: 19/188,262

(22) Filed: Apr. 24, 2025

(51) Int. Cl.
| | |
|---|---|
| G06F 3/0485 | (2022.01) |
| G06F 3/0482 | (2013.01) |
| G06F 3/0488 | (2022.01) |
| H04L 51/04 | (2022.01) |

(52) U.S. Cl.
CPC .......... G06F 3/0485 (2013.01); G06F 3/0482 (2013.01); G06F 3/0488 (2013.01); *G06F 2203/04808* (2013.01); *H04L 51/04* (2013.01)

(58) Field of Classification Search
CPC .... G06F 3/0482; G06F 3/0485; G06F 3/0488; H04L 51/04
See application file for complete search history.

(56) References Cited

U.S. PATENT DOCUMENTS

| | | | |
|---|---|---|---|
| 2014/0075366 A1* | 3/2014 | Reyes | G06Q 10/109 715/772 |
| 2016/0081134 A1* | 3/2016 | Chow | G06F 16/337 455/419 |
| 2016/0291864 A1* | 10/2016 | Lucic | G06F 3/0416 |
| 2018/0335928 A1* | 11/2018 | Van Os | G06Q 20/204 |
| 2020/0134518 A1* | 4/2020 | Bakshi | C12N 9/6437 |

* cited by examiner

*Primary Examiner* — Seth A Silverman
(74) *Attorney, Agent, or Firm* — Anton J. Hopen; Trenam Law

(57) ABSTRACT

The disclosed system provides gesture-based capture, storage, and retrieval of multiple unsent message drafts in a mobile messaging interface. A first touchscreen gesture performed in the message-composition field saves the current unsent text as a draft, clears the field, and tags the draft with conversation and timestamp metadata in local memory. A second distinct gesture invokes a transient overlay containing a scrollable list of stored drafts, allowing the user to select and restore any draft to the composition field for editing or transmission. Draft ordering may be dynamically ranked by heuristic or machine-learned analysis of factors such as recency, unread incoming messages, or explicit user pinning. The architecture, implemented entirely in client software, requires no changes to messaging protocols and is applicable to SMS, RCS, customer-support chat, collaborative editors, and CRM communication modules.

30 Claims, 7 Drawing Sheets

GESTURE-BASED MULTI-DRAFT MANAGEMENT SYSTEM FOR MESSAGING APPLICATIONS

BACKGROUND OF THE INVENTION

Field of the Invention

The present invention relates generally to user interface enhancements for electronic messaging applications on mobile devices. More particularly, it pertains to systems and methods in the field of messaging interfaces and mobile UI gesture recognition, enabling users to save, manage, and retrieve multiple unsent message drafts through gesture-based interactions on touch-screen devices. This invention lies at the intersection of mobile messaging software and gesture-driven user experience, addressing the technical domain of how message composition interfaces handle draft messages in conversational threads.

Brief Description of the Prior Art

Modern messaging applications (such as SMS/text messaging apps, instant messengers, and chat clients) typically allow a user to compose a message in a text input field and send it in real-time. Unlike email clients, which have long offered robust draft-saving capabilities (including multiple concurrent drafts and email threading for unsent replies), most messaging apps provide only minimal support for draft messages. Rich Communication Services (RCS), an upgraded messaging standard used in many Android messaging apps provides a basic "Draft" indicator when a user exits a conversation with unsent text.

However, these existing solutions are limited to a single draft per conversation and offer no dedicated interface for managing multiple unsent messages. In practice, if a user has started writing a message and then begins a different message in the same chat thread, the original unsent text is often overwritten or lost. This limitation forces users to either send incomplete thoughts, lose their partial messages, or resort to cumbersome workarounds (such as copying text to a notes app or sending the content to themselves) to preserve multiple ideas. The lack of multi-draft management in messaging stands in contrast to email applications. Email clients allow saving multiple drafts simultaneously, even within the same thread, and enable users to resume any draft at will. For example, in email, a user can compose responses to different emails in parallel, each saved as a separate draft. Threaded email conversations can accumulate multiple unsent replies, and the user interface clearly indicates and stores each draft until the user decides to send or delete it.

No analogous feature exists in popular chat applications, where communication is more instantaneous and interface design has prioritized simplicity over draft management. As a result, when composing messages in a texting app, users may struggle to juggle multiple pending responses or ideas, particularly in fast-paced conversations or when multitasking across chats. Some recent improvements in messaging highlight the need for better draft handling but still fall short. For instance, WhatsApp and other chat platforms have introduced features that mark a chat with a "Draft" label if a message is typed but not sent, sometimes even surfacing that chat to the top of the conversation list. While this is useful, it only preserves one unfinished message per chat and does not allow users to manage several different drafts concurrently within the same conversation. Similarly, workplace messaging tools (e.g., Slack or Microsoft Teams) will save an unsent message in a channel or chat and indicate it with a small icon or italic text, but again only one per channel. If the user starts a new message, the previous unsent content is replaced. In group chats or busy support channels, this means a partially composed reply can be unintentionally lost when shifting focus to another urgent message.

The constraints of current messaging interfaces become especially apparent in scenarios where a user might need to prepare multiple responses. Consider a customer support agent using a mobile chat interface: they may have to draft several partial answers or gather information before responding to a client's query. Existing chat tools do not allow multiple separate draft responses to be open at once—an agent must either send what they have (even if incomplete) or erase it to start a different reply, risking loss of work. Another scenario is in personal messaging: a user might want to reply to a friend's long message in segments or keep a thoughtful reply in progress while also jotting down a quick aside to send later. The lack of multi-draft support hampers the user's flexibility to manage these tasks.

Gesture-based interactions on mobile devices have proven effective for enhancing user experience in other contexts yet have not been fully leveraged for draft management in messaging. For example, email apps on smartphones (such as Apple's iOS Mail) introduced a gesture to handle drafts: swiping down on a compose window will minimize the draft email into a "dock" at the bottom of the screen. A user can stack multiple minimized email drafts this way and tap to retrieve any one or swipe them away to discard, much like managing multiple browser tabs. This gesture-driven draft handling in email demonstrates that users can intuitively manage multiple compositions with simple touch actions. However, no comparable gesture-based solution exists for chat applications, which typically confine the user to one active text box per conversation. In summary, the prior art in messaging draft management is limited and does not adequately address user needs for flexibility and multitasking.

Single-Draft Limitation. Current messaging apps (SMS, RCS, chat platforms) only maintain one unsent draft per conversation, leading to loss of earlier drafts when a new message is started.

Lack of Interface for Drafts. There is no scrollable or dedicated UI in chats to view multiple drafts; at best, a single draft is indicated in the chat list without detail or easy access.

Gesture Opportunities Untapped. Existing systems have not utilized mobile touch gestures for quick saving or retrieval of message content (beyond basic swipes for deletion or navigation), missing an opportunity for faster user interactions.

Contrast with Email. Email systems (and some forum or social media draft features) highlight the benefits of multi-draft management and suggest that similar capabilities in messaging would be advantageous.

User Inefficiencies. Without multi-draft support, users face interrupted workflow, needing to save text elsewhere or risk forgetting unsent messages, which can reduce productivity and even lead to communication errors or missed information.

Therefore, there is a clear need for an improved mechanism in messaging applications that allows users to capture and manage multiple unsent message drafts seamlessly. Such a solution should integrate with the existing messaging interface without adding significant complexity and ideally leverage intuitive gestures to minimize friction. It should also maintain context (e.g., link drafts to their conversation threads) and intelligently prioritize which draft is shown or suggested to the user, mitigating the risk of forgotten responses. By addressing these gaps, the invention would bring the convenience of robust draft management—long enjoyed in email and desktop word processing—to the realm of mobile messaging and other real-time communication tools.

BRIEF SUMMARY OF THE INVENTION

The invention, termed "QuickScroll," provides a novel system and method for enhancing messaging applications with the ability to save, manage, and retrieve multiple unsent message drafts through gesture-based interactions. QuickScroll introduces a gesture-recognition enabled draft management interface within a messaging app, allowing users to quickly store the current content of a message composition and recall it later, all without leaving the conversation view or using cumbersome menus. Key aspects of the QuickScroll system include:

Gesture-Based Draft Capture. QuickScroll defines intuitive touch gestures (such as a swipe or specific multi-touch gesture on the message input area) that instantly save the current text in the composition field as a draft. For example, a swipe down on the text input field (the "gesture input field") could trigger a draft save operation, moving the current unsent message into a stored drafts list and clearing the input for a new message. This allows users to preserve a partial message with a simple gesture whenever they need to pause or compose another message.

Scrollable Draft Overlay Interface. The invention provides a draft overlay—a transient user interface element that can be invoked via gesture or button—which displays multiple saved drafts in a scrollable list or stack overlaying the messaging interface. Users can swipe through this overlay (horizontally or vertically) to navigate through their unsent drafts. Each draft in the overlay is presented as a preview (for example, a snippet of the text or a small bubble) that the user can tap to restore into the message input field for editing or sending. The overlay is designed to be unobtrusive, appearing on demand (e.g., via a scroll means such as a two-finger swipe up gesture) and dismissible with a simple gesture (like tapping outside or swiping it away).

Multiple Draft Management in Thread Context. QuickScroll's system links drafts to their respective conversation threads (or contexts) and allows multiple drafts within the same conversation or across different conversations to be maintained. In one embodiment, if a user has several unsent messages in a single chat thread, the overlay will show all those drafts associated with that thread. In another embodiment, QuickScroll could provide a unified draft viewer that aggregates drafts across multiple conversations (e.g., listing drafts under each conversation header), enabling quick access to any unfinished message in the app. The system ensures that retrieving a draft restores it to the appropriate context (e.g., the correct recipient or channel).

Predictive Draft Prioritization. To further enhance user experience, QuickScroll includes a predictive logic module that automatically ranks or highlights drafts based on their relevance or urgency. For instance, if multiple drafts exist, the system can prioritize displaying the one in which the conversation partner has since sent a follow-up message (indicating a response might be particularly timely), or the one that has been idle the longest (indicating it might have been forgotten). This predictive prioritization can be based on factors like the time a draft was saved, whether the conversation has had new messages since saving, or contextual cues (such as keywords suggesting importance). The summary view in the draft overlay might reorder drafts or visually emphasize a suggested draft for completion. This intelligent ranking helps users quickly decide which unsent message to address first.

Seamless Integration and User Feedback. QuickScroll integrates into the messaging interface such that saving and switching drafts feels like a natural extension of the chat experience. Visual cues and subtle animations provide feedback for the gestures (for example, the input field might flash or display a small "Saved to Drafts" indicator when the user performs the save gesture). The system may also show a small marker or icon in the conversation view indicating the presence of saved drafts (e.g., a stack of papers icon or a numbered badge showing how many drafts exist in that chat), ensuring the user is aware of unsent messages. Importantly, the user can utilize all these features without navigating away from the chat window, preserving context and flow.

Robust Draft Storage and Sync. In some embodiments, QuickScroll can store drafts persistently on the device (and optionally sync across devices or backup to a cloud service if the messaging platform supports it), so that drafts are retained even if the app is closed or the device is restarted. The storage is organized per conversation and timestamped. Efficient data structures ensure that even numerous drafts do not degrade performance. Additionally, security measures can be included to encrypt draft content when stored, maintaining user privacy.

By combining these features, the QuickScroll invention provides a solution to the shortcomings of current messaging apps. It offers users the ability to quickly alternate between multiple pending messages with simple gestures, much as one might quickly shuffle through index cards or notes. This improves multitasking within conversations, reduces the cognitive load of remembering unfinished messages, and minimizes the risk of losing important unsent information. QuickScroll is broadly applicable: while the primary use case is SMS or chat applications on smartphones, the same principles can benefit any text-composition interface where temporary drafts are useful. The invention can be implemented in software (as part of a messaging app or OS-level input method) and leverages existing hardware (touchscreens and motion sensors) for gesture detection, making it a practical enhancement to modern mobile communication devices.

More specifically, the invention disclosed herein provides a comprehensive method and system for managing unsent message drafts within a messaging application. The method begins by detecting a first user gesture performed at a message composition interface. This gesture, such as a swipe or multi-touch action, serves as a trigger to initiate the draft-saving process. The message composition interface typically refers to the text input field in a chat or messaging application, and the detection of the gesture is handled by a gesture detection module integrated into the application. This module monitors touch input from the device's touchscreen and identifies patterns corresponding to specific user commands, including draft capture.

Once the gesture is recognized, the method continues by saving the content currently present in the composition interface. The unsent message text is stored as a draft message in a local memory associated with the messaging application. This may include persistent storage structures such as SQLite databases on Android or CoreData stores on iOS. The system associates the draft with the current conversation thread by recording a conversation identifier along with a timestamp, thus allowing multiple drafts per thread. After saving, the system clears the message composition field, enabling the user to begin composing a new message without interference from the previously drafted content.

Subsequently, the method detects a second user gesture, again at the message composition interface. This second gesture is distinct from the save gesture and is used to initiate the retrieval of saved drafts. In a preferred embodiment, this may be a long-press gesture recognized by the same gesture detection module. In response, the system displays an overlay interface within the messaging application. This overlay, rendered by the UI renderer module, presents one or more saved draft messages in a scrollable list format. The overlay interface is drawn over the existing conversation view and may utilize translucent rendering techniques to distinguish itself visually while still maintaining conversational context.

The draft overlay presents each saved draft in a condensed or preview format, enabling users to scan through unsent messages. This list is implemented using standard scrolling UI controls, enabling vertical or horizontal navigation, depending on the design. In some implementations, the overlay is styled as a semi-cylindrical layout to provide visual distinction and spatial orientation for quick selection. Each preview card or item in the list corresponds to a saved draft and is linked to metadata such as creation time and associated conversation thread.

The method then detects a user selection of one of the draft messages from the overlay interface. Upon selection, the system populates the message composition interface with the content of the selected draft. The draft manager retrieves the full content from storage and passes it to the UI renderer, which inserts it into the input field. The overlay interface is then dismissed, restoring the user's focus to the standard messaging interface and allowing further editing or sending of the draft message.

The method as described provides a complete lifecycle for gesture-based draft management in a messaging environment. Each limitation is essential: the gesture-based triggers provide a non-intrusive method for user interaction, local memory storage ensures persistence, and the overlay interface allows intuitive access to previously saved drafts.

The method may be further refined as follows. In one embodiment, the first user gesture comprises a predefined touch input, including a swipe gesture or a multi-touch gesture performed on the message input field. These gestures are configured to be distinct from typical UI interactions such as scrolling or cursor placement, reducing the likelihood of false positives and ensuring intentional engagement with the draft system.

Similarly, the second user gesture may be implemented as a long-press or prolonged touch input. The duration and location of the press are parameters used by the gesture detection module to distinguish this input from standard interactions. This gesture invokes the draft overlay and enables access to stored drafts.

When saving a draft message, the content is stored in a structured format, typically as a data record in a local database maintained by the messaging application. This record includes fields for the draft text, a thread or conversation ID, and a timestamp. The use of a local database ensures that drafts are retained even across app restarts or device reboots.

The overlay interface may further include a scrollable list display, implemented using standard UI frameworks. This list overlays the conversation view and allows the user to navigate through saved drafts using scroll means, such as swipe gestures or other navigational controls. In a preferred design, the layout of the overlay may be compact and semi-cylindrical, visually presenting the drafts as stacked items that the user can flick through vertically.

To enhance functionality, the overlay may include user interface controls for managing drafts. This includes buttons or icons for adding a new draft, deleting an existing draft, or reordering the list. These controls allow users to curate their draft list and remove obsolete or redundant messages.

The system may further prioritize the order in which drafts are displayed based on usage metrics. A predictive ranking engine may analyze each draft's recency, access frequency, and contextual relevance to determine an optimal ordering. For instance, drafts linked to conversations with recent incoming messages may be shown at the top of the list.

Each saved draft is linked to a conversation identifier, ensuring that it is restored to the correct thread upon selection. When a user selects a draft from the overlay, it is reinserted into the input field of the same conversation in which it was created.

Optionally, saved drafts may be synchronized to a remote storage service or server. This allows drafts to be accessed from multiple user devices, such as a phone and a tablet. Synchronization may be performed via authenticated API requests to a backend messaging service and involve serializing the draft data (e.g., using JSON) for transmission.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

The QuickScroll system will now be described in detail with reference to the drawings. In the following description, numerous specific details are set forth (such as particular gesture types, interface layouts, and data structures) in order to provide a thorough understanding of the invention. It will be apparent, however, to one skilled in the art that the invention may be practiced without some of these specific details or with alternative but equivalent elements. Throughout the description, like numerals refer to like elements in the figures. For example, an element labeled as a "draft overlay (220)" in one figure refers to the same or similar component as "draft overlay 220" in another figure.

System Architecture and Components

Figure 1:
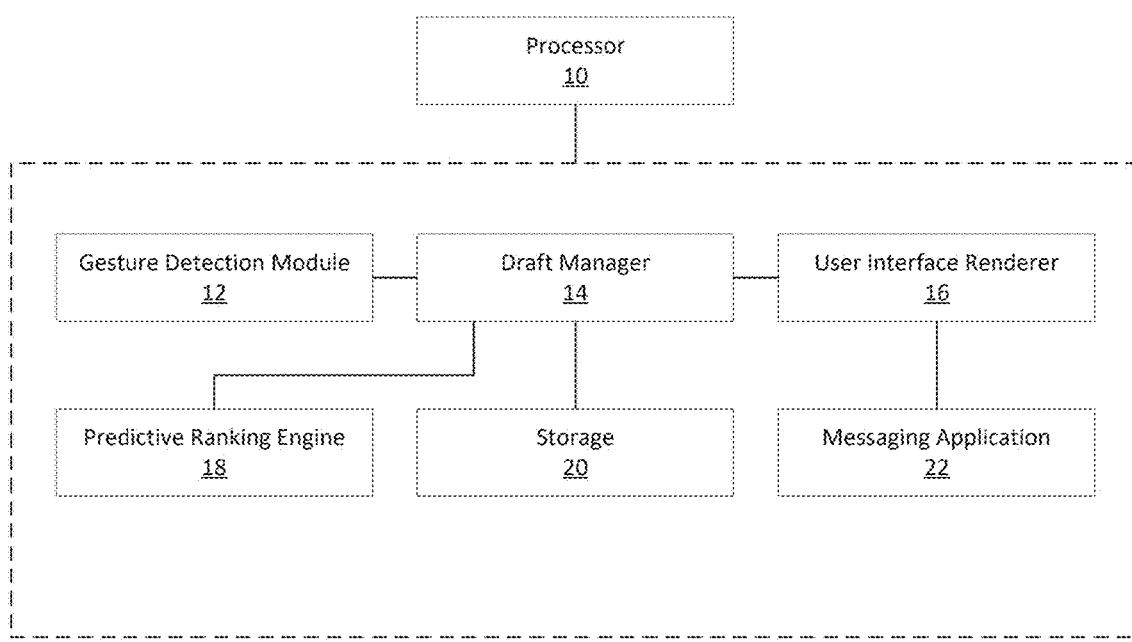
FIG. 1 is a block diagram of module interoperation according to an embodiment of the invention.

Referring first to FIG. 1, a block diagram of a mobile device architecture incorporating QuickScroll is presented. The device is typically a smartphone or tablet computer comprising standard hardware: a processor 10, system memory, persistent storage 20, a touchscreen display for both input and output, and network interfaces for messaging connectivity. The messaging application 22 runs on this device, which could be an SMS client, instant messaging app, or any text-based communication program. The QuickScroll functionality may be integrated as part of the messaging app 22 or as a middleware service working in conjunction with it. Key software modules of the QuickScroll system include:

Gesture Detection Module 12. This module interfaces with the device's touch input subsystem to recognize specific gesture inputs designated for QuickScroll actions. It filters raw touch events and detects patterns such as swipes in particular directions, multi-touch swipes (e.g., two-finger gestures), long-press-and-drag motions, or other pre-defined gesture sequences. The gesture detection module distinguishes QuickScroll commands from ordinary text input touches (e.g., typing on the keyboard) by their form (for instance, a swipe gesture covering a certain minimum distance on the input field area).

Draft Manager 14. The draft manager is responsible for creating, storing, retrieving, and deleting draft messages. It interacts with the messaging app's data storage to save the content of the message composition field as a draft object, tagged with metadata such as the conversation ID (thread identifier), timestamp, and possibly a draft ID. The draft manager maintains a list (or stack) of drafts for each conversation. This module implements the logic to add new drafts when a capture gesture is received, fetch drafts when the user requests to view or edit them, and remove drafts upon sending or discarding.

User Interface Renderer 16. This component handles the display of the draft overlay and any visual indicators in the messaging UI related to QuickScroll. When the user invokes the overlay (e.g., via a gesture recognized by module 12), the UI renderer constructs the overlay interface (220 in FIG. 2) on top of the existing chat view, populating it with draft previews obtained from the draft manager 130. It also updates the main text input field (46 in FIGS. 3 and 7) when a draft is loaded or saved (e.g., clearing it on save, filling it on load). The UI renderer ensures smooth animations and clear user feedback (such as highlighting a draft card on selection, or animating the transition of text from the input field into a saved state).

Predictive Ranking Engine 18. In some embodiments, the system includes an intelligent module that analyzes the context and usage patterns to prioritize drafts. This engine might run periodically or upon certain triggers (like receiving a new incoming message or opening the overlay) to score drafts. Inputs to this engine can include: how recently each draft was edited, whether the conversation has unread messages (implying the other party responded while a draft is pending), the length or content of the draft (perhaps identifying urgent language like "ASAP" or question marks), or user-specific patterns (e.g., the user frequently returns to certain drafts first). The ranking engine outputs an ordering or a highlighted selection which the UI renderer 16 uses to order the draft overlay or suggest a draft (for example, by placing it at the top of the list or indicating it with a distinctive color/border).

Optionally, QuickScroll can synchronize drafts to a user's account in the cloud (especially if the messaging service itself is cloud-based). In this case, the draft manager 14 communicates via the network interface (not shown) to upload draft data and retrieve it on another device. Drafts could be accessible across multiple devices (for instance, a user could save a draft on their phone and retrieve it later on a tablet or desktop client).

Standard Messaging Backend. The QuickScroll system works alongside the normal messaging send/receive functions. When a user decides to send a retrieved draft, the message is handed to the regular sending mechanism of the app, and from the perspective of the messaging service (SMS network, chat server, etc.), it is just a normal message being sent. QuickScroll augments the client-side experience but does not require changes to the messaging protocols themselves.

Figure 2:
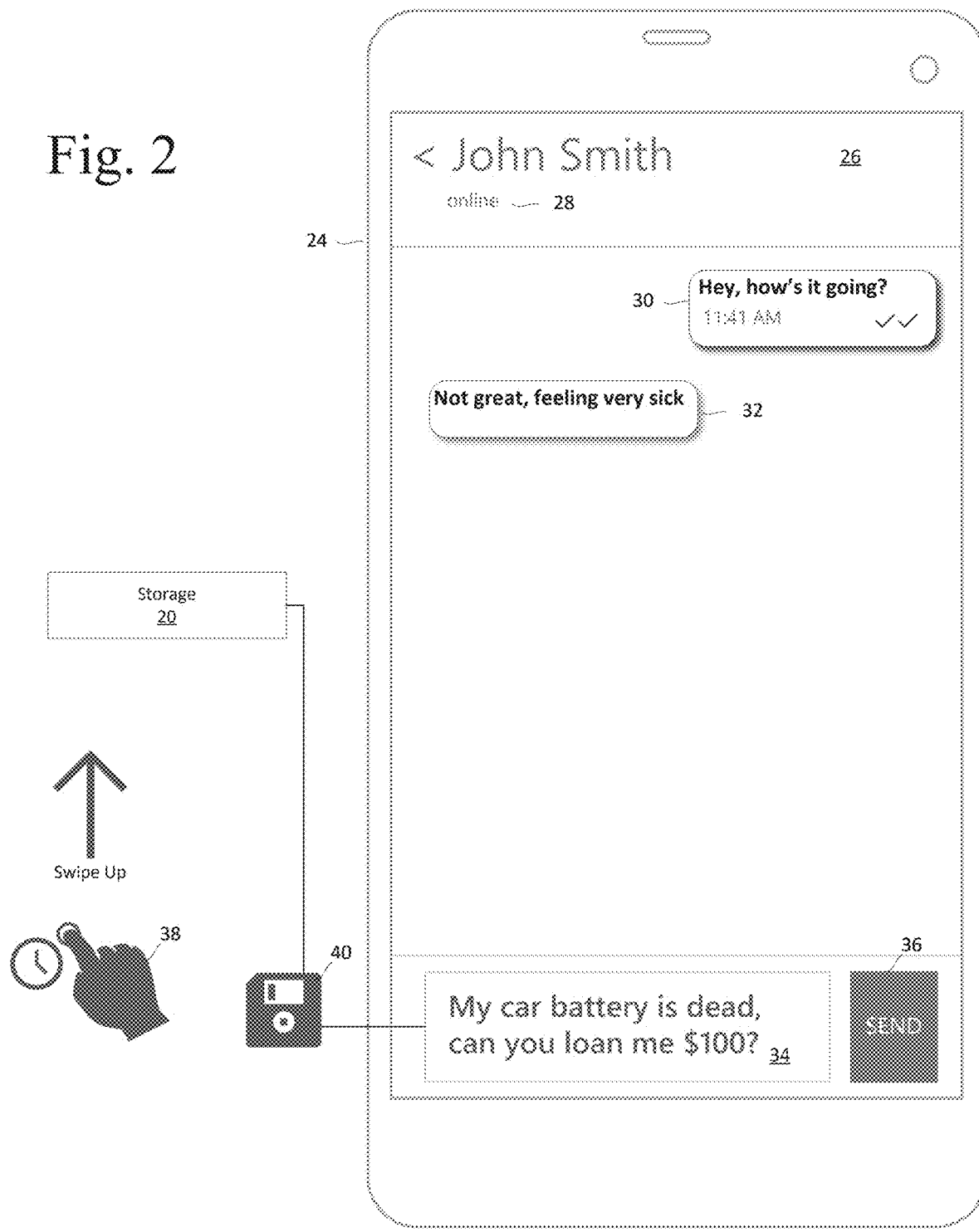
FIG. 2 is a user interface showing an unsent message not sent by the user and saved via a gesture based on the direction of a first chat conversation.
Figure 5:
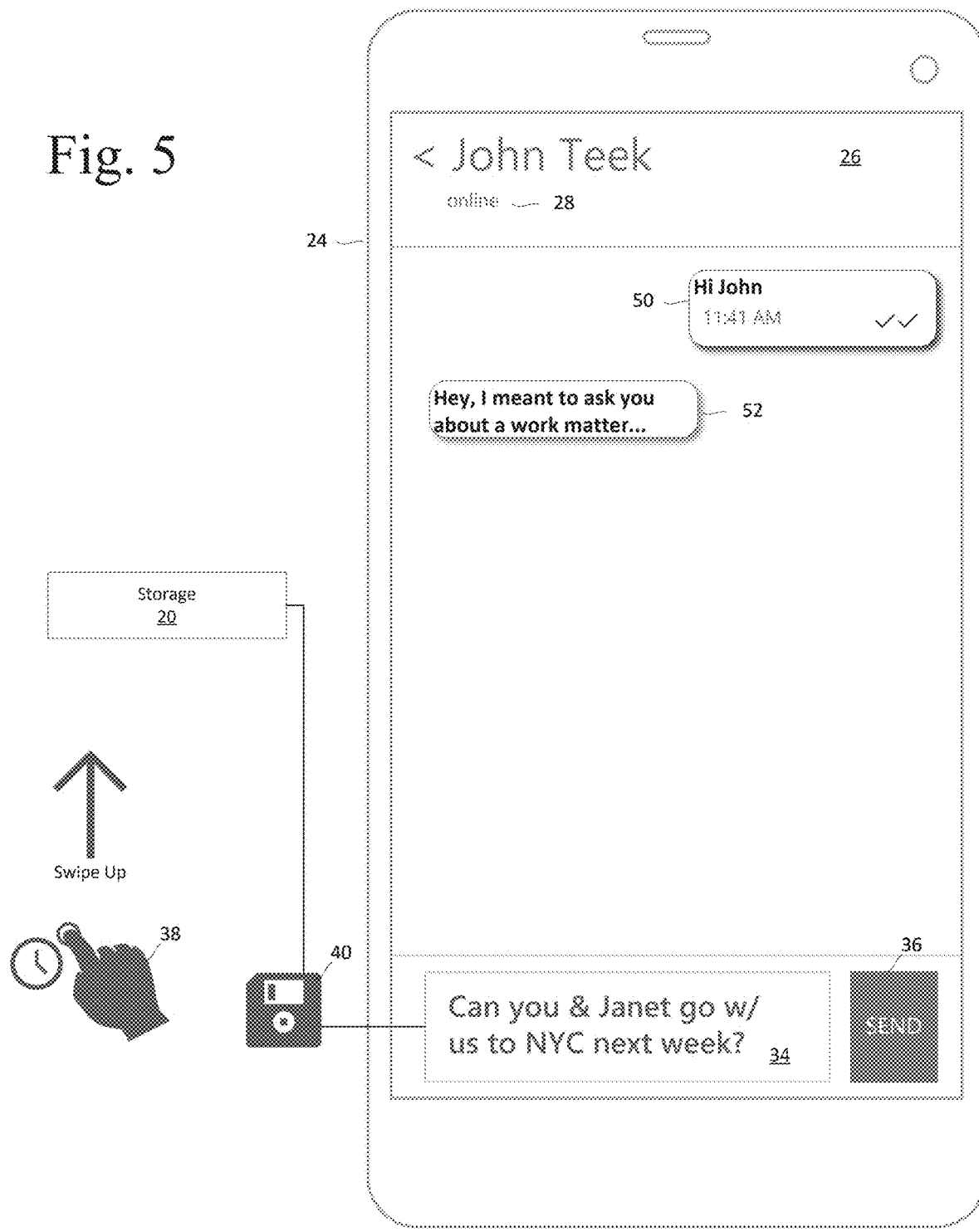
FIG. 5 is a user interface showing an unsent message not sent by the user and saved via a gesture based on the direction of a second chat conversation.

Gesture-Based Draft Capture (FIG. 2 and FIG. 5)

Turning to FIG. 2, the user interface of a messaging application with QuickScroll is depicted at a moment when the user is performing a draft-saving gesture. In this embodiment, the gesture input field 34 corresponds to the text entry box where the user types a message. QuickScroll repurposes this field as a sensitive area for gestures when certain conditions are met (for example, when the on-screen keyboard is open and the field is not empty). In FIG. 2, the user has typed a portion of a message (for instance, "My car battery is dead, can you loan me $100?") but wishes to hold that thought and start a different message. Instead of abandoning the text or sending it prematurely, the user initiates the save gesture. In one preferred embodiment, the save gesture is timed hold then a quick swipe upward starting from the text input field 34. The figure shows an arrow indicating this upward swipe. The system is configured such that a swipe-up gesture on the input field, when that field contains unsent text, triggers QuickScroll to capture the text as a draft. As soon as the gesture is detected by the gesture detection module 12.

Detect Gesture. The touchscreen reports continuous touch coordinates. The gesture module recognizes a upward swipe pattern over the input field's region. It verifies that the gesture meets predefined criteria (e.g., a vertical movement exceeding a threshold distance within a short time, possibly using one finger for simplicity).

Confirm Draft Capture. Optionally, the system may provide haptic or visual feedback immediately to indicate the draft will be saved. For example, a slight vibration or a brief change in the color of the text field background can be used as confirmation. This is to assure the user that the action is recognized (especially important if the text field is about to be cleared).

Store Draft. The draft manager 14 creates a new draft entry. It copies the current content of the text input field 34 into memory, along with metadata: conversation identifier (so it's linked to the correct chat or recipient), a timestamp, and possibly an ordinal if needed (e.g., if multiple drafts are numbered or labeled). The new draft is added to the list of drafts for that conversation. If desired, the system can also immediately assign a short preview or title to the draft (for display purposes in the overlay, typically just the first few words of the text).

Clear Input Field. After storing, QuickScroll automatically clears the text input field in the UI, effectively giving the user a blank slate to type a new message. This differentiates the gesture from a normal scroll (which in a chat might scroll the conversation history)—here the content disappears from the input box because it's safely saved elsewhere. The user can now begin typing a different message without losing the first one.

Update Draft Indicator. The UI renderer 16 may update the interface to reflect that a draft was saved. For instance, near the top of the conversation or in the app's conversation list, an icon or label "Draft saved" might appear. In FIG. 2, one could imagine a small icon 35 appearing next to the conversation title indicating drafts exist. If the conversation list (inbox view) is visible, that conversation might show "Draft" text in the preview line (similar to some apps)—these UI specifics can vary by implementation.

End Capture. The system returns to an idle composition state with an empty input field. The user's keyboard remains open (unless the design chooses to hide it briefly as part of feedback) so the user can immediately start typing a new message if desired. At this point, the new draft resides in storage, and the user can create additional drafts by repeating the process. Each subsequent draft save gesture will add another draft to that conversation's draft list.

It should be noted that alternative gestures could be used for capturing a draft. In another embodiment, the gesture could be a pinch-in on the text area or a two-finger tap. The choice of an upward swipe is advantageous because it mimics pushing the content up into storage (a metaphor consistent with some email clients). Additionally, it's unlikely to conflict with the common scroll gesture used to review past messages in the chat (since that typically starts in the message history area, not in the text input box itself). Nonetheless, the system could be configured with a different gesture or even a dedicated button (e.g., a small "Save Draft" icon next to the input field that the user can tap) to accommodate various user preferences and accessibility needs.

Draft Overlay and Retrieval of Drafts (FIG. 3, FIG. 4, FIG. 6, FIG. 7)

Figure 3:
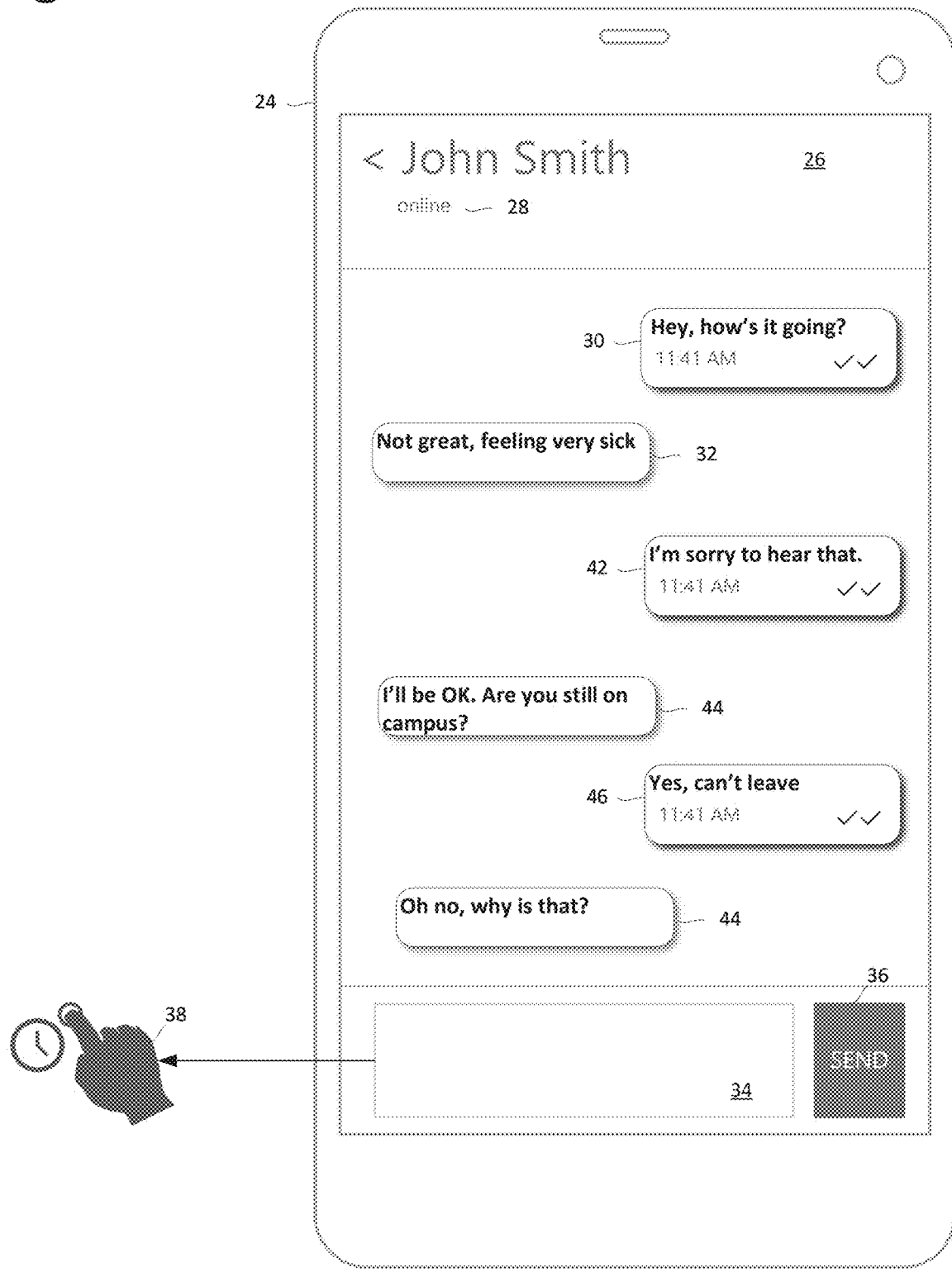
FIG. 3 is a user interface showing a gesture by the user indicative of a command to bring up unsent draft chat messages.
Figure 4:
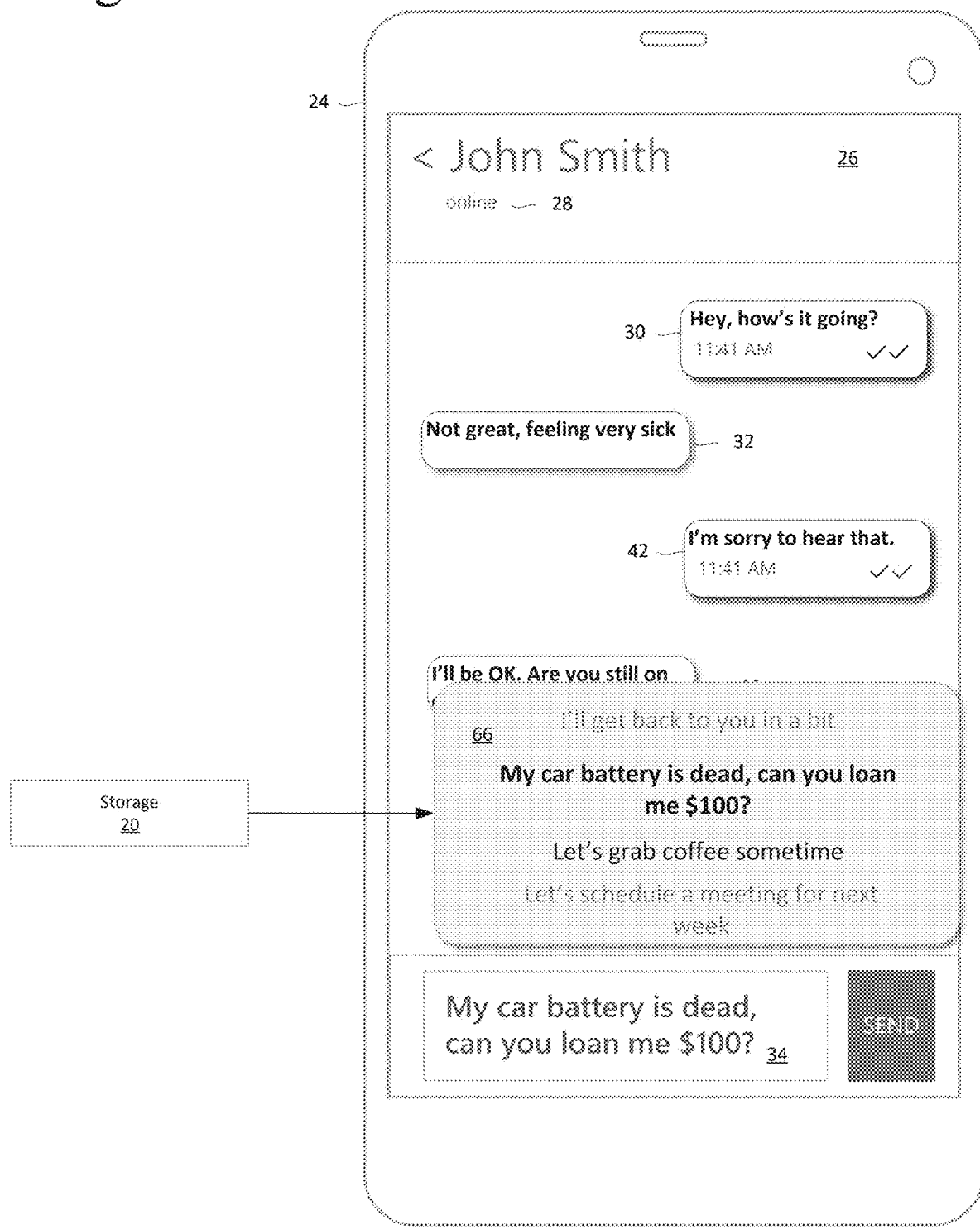
FIG. 4 is a user interface showing a scrolling control enumerating a plurality of unsent chat messages for selection.
Figure 6:
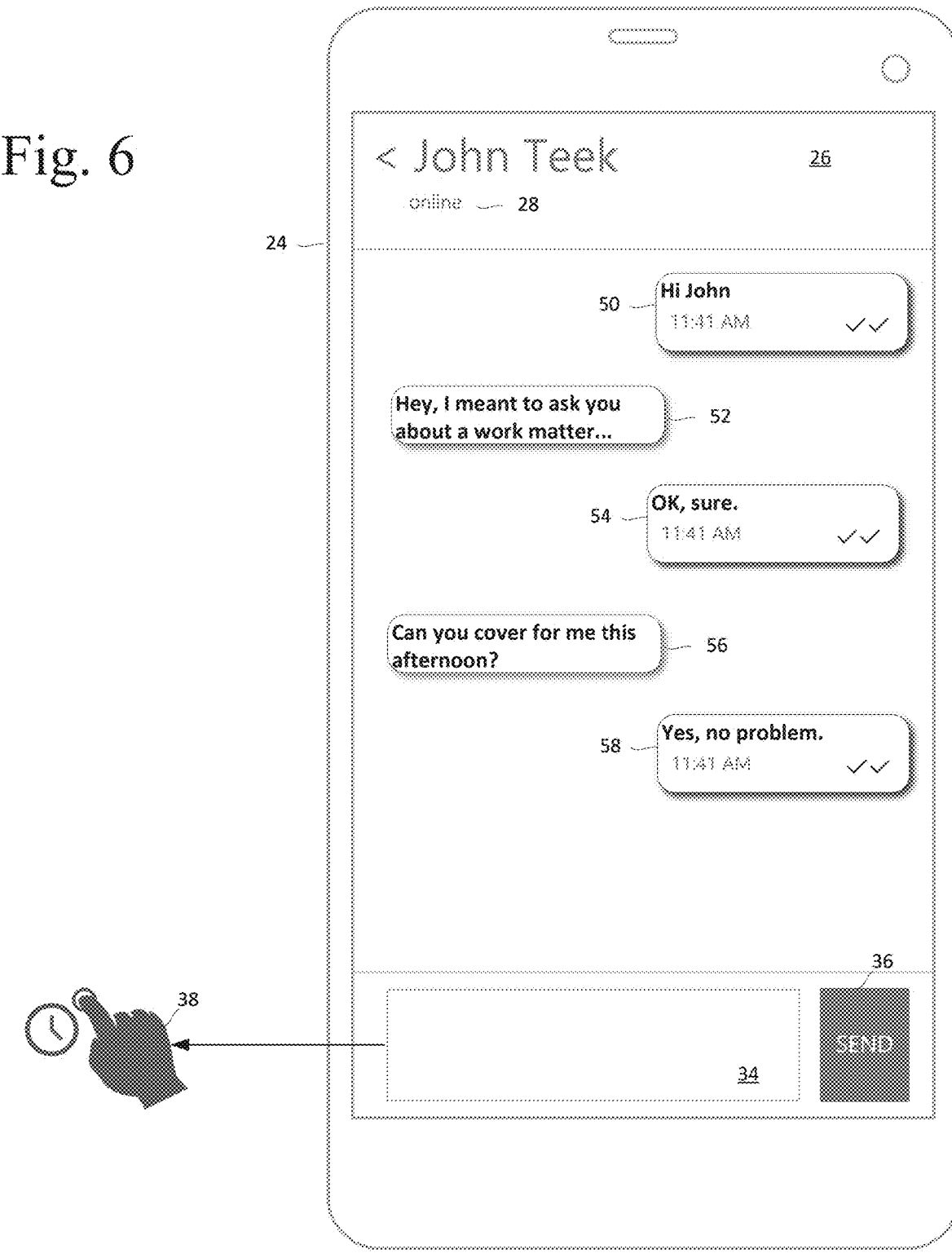
FIG. 6 is a user interface showing a gesture by the user indicative of a command to bring up unsent draft chat messages.
Figure 7:
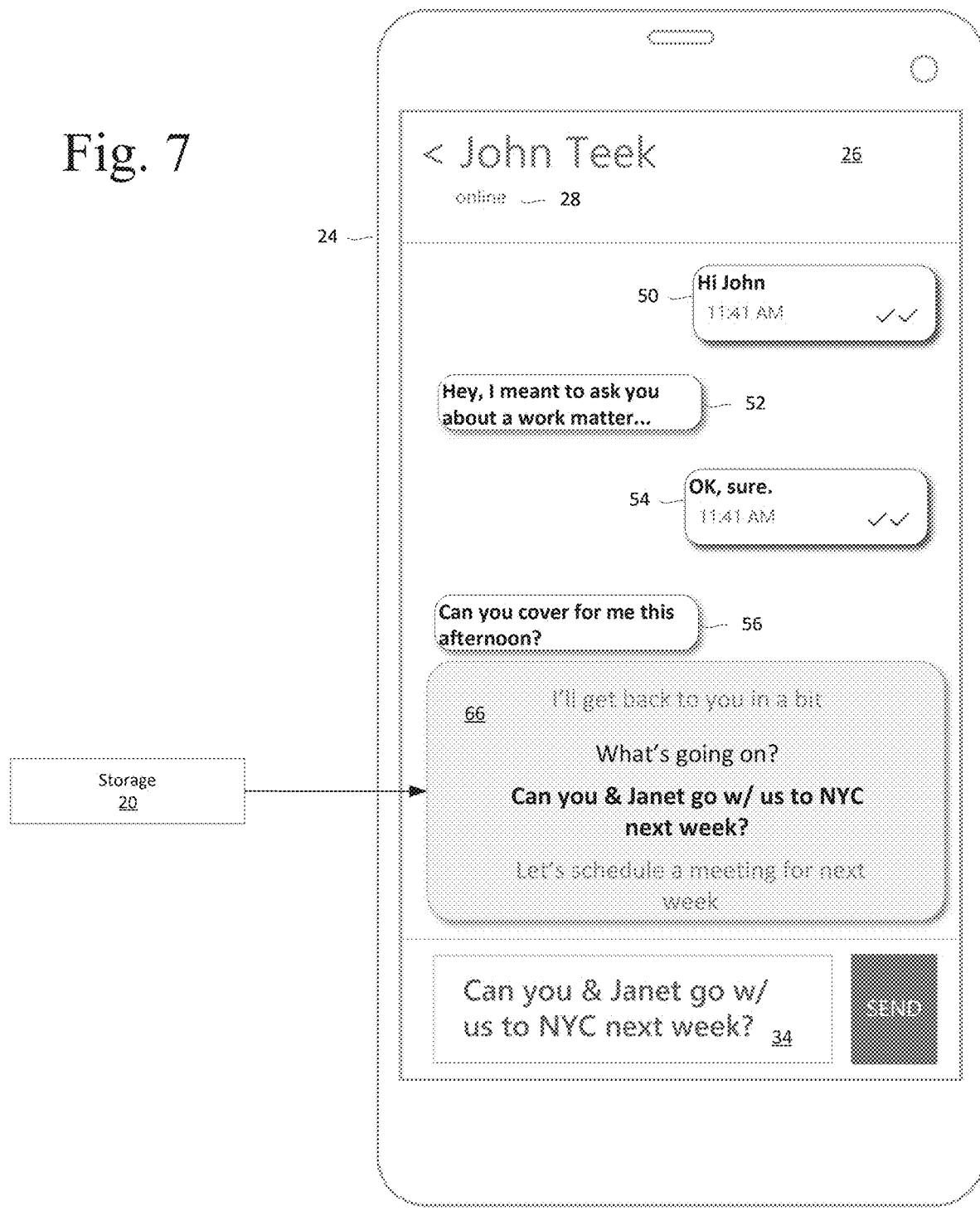
FIG. 7 is a user interface showing a scrolling control enumerating a plurality of unsent chat messages for selection.

Once one or more drafts have been saved in a conversation, QuickScroll provides mechanisms to retrieve and view those drafts. FIGS. 3 and 6 show the long press 38 in text box control 34. In this illustration, the user will invoke the overlay by performing a specific gesture, for example, a long press within the message input area 34. The rationale for a long-press as the trigger is that it is a distinct gesture less likely to be done accidentally, and semantically it can represent "seeking" stored content. Upon recognizing the overlay invocation gesture, the system enters the Draft Browse state (as shown in FIGS. 4 and 7). The UI renderer 16 generates the overlay 46, which appears as a translucent panel or a card stack above the conversation view. Each saved draft is displayed as an element in this overlay:

If only one draft is saved, the overlay might simply show that draft's text in a larger preview, possibly with a label "Draft 1".

If multiple drafts are present (as FIGS. 4 and 7 depict), they can be arranged in a list (vertical stack) or a carousel (horizontal stack). Each draft entry can include a snippet of the message text, and maybe an timestamp or other indicator (like "Saved 5 min ago" or a small icon if the draft contains media or attachments in other contexts).

The topmost draft might be highlighted or centered. In the example, it may correspond to the first message the user saved ("My car battery is dead, can you loan me $100?"), while another unsent message ("Let's grab coffee sometime?"), and yet another ("I have Let's schedule a meeting for next week"), all within the same conversation.

The user can scroll through this overlay using standard touch scrolling gestures. A swipe gesture on the overlay itself cycles through drafts one by one. For instance, a vertical swipe on the overlay will move the next draft into view (if the overlay is vertical), or a horizontal swipe if the drafts are arranged horizontally. As the user scrolls, the overlay updates to show the current focus draft in the center. To retrieve (load) a particular draft into the compose field for editing or sending, the user selects it. This can be done in various intuitive ways:

Simply tapping on a draft entry (while the overlay is open) can select that draft and populate text box 34. If using a swipe-to-cycle approach, the user might scroll until the desired draft is centered, then perform a quick swipe down gesture on that draft card to indicate "load this" (this could be a design if we want to avoid extra taps). Another approach seen in some UI patterns is that lifting the fingers after scrolling and pausing for a short moment on a draft could auto-load it. For clarity, a straightforward method is a tap to select: the user taps a draft in FIG. 4, wanting to resume that message. When a draft is selected, the system carries out the draft retrieval process: Draft Selection Detected: The user's tap or selection input on a draft in the overlay is registered. The system identifies which draft (by ID or list index) was chosen.

Close Overlay: Before or while loading the draft, the overlay UI 46 is dismissed, returning focus to the main conversation interface. This removal may involve an animation of the draft card merging into the input field area for a smooth effect. Load Draft into Input: The content of the selected draft is retrieved from storage by draft manager 14 and inserted into the message composition field (text box control) 34. Now the text box is populated exactly as it was when the draft was saved. The user can see the draft text in the input area and the blinking cursor after it, indicating it's ready for editing or immediate sending. Update Draft State: The system may treat the loaded draft as the "active draft." In the draft list, this draft could be flagged as currently loaded (to avoid confusion if the user doesn't send it and then opens the overlay again). The draft might remain in the list or be temporarily removed from it while active. Different embodiments handle this differently: one might remove it from the stored drafts list until the user either re-saves it (e.g., it gets a new ID if modified) or sends it (upon sending, it's naturally gone). Another embodiment might keep it in the list with a special mark, allowing the user to load another draft without sending the first (this could lead to multiple drafts being loaded one after another which might complicate the UI, so typically one draft is active at a time per conversation).

Resume Compose State: The user is now in the normal compose mode but with pre-filled text. They can continue typing to finish the draft, make changes, or hit the send button to transmit the message. If they make changes and then decide to save it again (instead of sending), performing the save gesture will update the draft content (it could overwrite the existing draft entry or save as a new entry, depending on implementation—likely overwriting the existing one is expected if the draft was loaded).

Send or Discard: If the user sends the message, QuickScroll can consider that draft resolved and remove it from the list. If the user manually discards (e.g., deletes all text or presses a "discard draft" button if provided), the draft manager will similarly remove the entry. The system then returns to idle or, if other drafts remain and the user triggers the overlay, they will still be available.

During this retrieval process, user feedback and smooth transition are important. FIG. 4 and FIG. 7's illustrations help ensure the action is visually clear: the selection of a draft might be accompanied by a brief highlight of that draft's card and an animation of it sliding into the input area. Such polish reduces user confusion about what happened to their unsent message. It should be noted that QuickScroll can allow repeated use in either order: a user might save two drafts (A and B) and then decide to retrieve the first one (A), edit it, then even save it again (perhaps under a new entry if it's significantly changed or just updating the original). The system is flexible to support fluid movement between drafts:

If a draft is loaded and then the user performs the save gesture again without sending, the system could either update that same draft entry's content or create a new draft entry. A preferred approach is to update the existing one (to avoid cluttering with many versions), but an alternative embodiment might intentionally keep an "edit history" by saving a new draft and leaving the old one—though this could confuse users, so it might be reserved for more advanced use.

A user can also start typing a brand new message after loading a draft, effectively ignoring the loaded content. In this case, they might either clear the field manually or just delete text. If they then save again, it would save whatever content is currently in the field (which might be empty or new content). The system should handle edge cases like saving an empty draft (which might simply do nothing or remove a draft if the text was deleted).

Managing Multiple Drafts and UI Indications

QuickScroll is designed to handle multiple drafts per conversation gracefully. In an example scenario, a user could have, say, three unsent drafts in a chat. The interface might provide a subtle indication of this even without opening the overlay. One embodiment is to show a small badge or icon near the input field or in the title bar of the chat with a number (e.g., "3" indicating three drafts saved). Another is to show a faint placeholder in the input field when it's empty and drafts exist, such as "Swipe up to view 3 saved drafts . . . ". These cues remind the user of pending drafts, addressing the common problem of forgetting unsent messages. Additionally, the conversation list (the screen listing all chat threads) could be enhanced. If a conversation has any saved drafts, that conversation entry can be marked (for example, showing the word "Draft" or an icon in the preview snippet). If multiple drafts per chat are allowed, the app might simply mark it if at least one draft exists, or could show "[Drafts: 3]" as part of the subtitle. This way, even if the user navigates away from a conversation, they have awareness of unfinished messages waiting in that chat. The draft overlay 46 itself might include controls for managing drafts in bulk:

There could be a delete icon or swipe-to-delete gesture for each draft card to discard ones that are no longer needed (e.g., the user changed their mind about sending that content). The overlay could allow reordering or pinning drafts if the user wants to manually prioritize one (though the predictive logic may handle prioritization automatically). If the list grows long, a scroll bar or indicator helps the user see that more drafts exist off-screen. The design of overlay can vary. For instance, a card stack where only one draft is fully visible at a time vs. a full list showing all drafts at once (which could be feasible if drafts are short or if the screen is large). The drawings (FIG. 4, FIG. 7) abstractly illustrate these possibilities without limiting to one design.

Predictive Prioritization of Drafts

One aspect of QuickScroll is the incorporation of analytics to help manage drafts. A predictive prioritization engine is described herein. The engine receives various inputs, processes them through a ranking algorithm, and produces an ordered list or scores for drafts. Possible inputs and their use:

Draft Age. The timestamp of when each draft was last saved or edited. The engine might assume older drafts are more likely to be forgotten and thus either increase their priority to remind the user or decrease priority if it deems them stale (different strategies can be taken—a balanced approach might periodically elevate an older draft to remind the user).

Conversation Activity. The presence of new messages in the conversation since the draft was saved. If, for example, the other participant has replied or sent new messages after the user saved a draft, that draft might become more urgent to finish (to avoid leaving the other side waiting). The engine can bump up drafts from active chats to the top of the overlay when it opens.

Draft Content Clues. The text of the draft might contain certain keywords or punctuation. A question (ending with "?") might be considered important to answer. Words like "urgent" or "ASAP" or mention of dates/times could indicate a time-sensitive message. On the other hand, a trivial note might not be as high priority.

User Behavior History. Over time, the system could learn from the user's interactions. Perhaps the user tends to save multiple drafts but usually sends them in the order they were created—or maybe the user often goes back to the most recent draft first. These patterns can inform the ranking. If the system has machine learning capabilities, it could adapt to whether the user prefers chronological or reverse-chronological retrieval and tailor accordingly.

Contextual Calendars/Tasks (in CRM or support contexts). In a CRM embodiment, if a draft is linked to a scheduled event (like a follow-up message that was drafted ahead of a meeting), the engine could note the current time relative to that event and raise the priority of that draft when appropriate.

The ranking module 18 might produce a simple sorting or a numerical priority score for each draft. The output then guides how the UI renderer 16 presents the drafts. For example: The highest-ranked draft might appear bolded and the center of the list in FIG. 4 or FIG. 7 or even auto-load when the user opens the conversation (with a prompt like "You have a draft message, would you like to continue it?"). The overlay might highlight the top suggestion with a brighter background or a star icon.

If priorities are close, it may simply sort by one of the factors (like newest first by default, which is intuitive, but override to show a more urgent older one at top if needed). This predictive feature is meant to enhance user experience but is not required for core functionality. It can be enabled or tuned based on user preference. The system could allow turning off predictive sorting for those who prefer strictly chronological management of drafts.

Alternative Embodiments and Use Cases

While the primary description of QuickScroll focuses on a mobile phone texting application, the invention is broadly applicable to other contexts where users compose and send textual (or multimedia) content and may benefit from holding multiple drafts. We describe several alternative embodiments and use-case scenarios to demonstrate the versatility of the invention:

Customer Support Chat Interfaces. In customer service, agents often handle multiple chats and need to gather information or approvals before responding. QuickScroll can be integrated into a support chat client on a tablet or desktop, enabling agents to park multiple response drafts. For example, an agent might draft a refund approval message but need a manager's confirmation and simultaneously start drafting an answer to a different question. Using QuickScroll gestures (which on a desktop could be trackpad gestures or keyboard shortcuts analogous to swipes), the agent can switch between the two drafts effortlessly. A support interface is provided with two draft bubbles (perhaps color-coded) that the agent can toggle. The predictive logic might prioritize the draft for the customer who has waited longer. This improves efficiency and ensures no draft response is forgotten during busy multitasking.

Collaborative Editing and Communication Tools. Consider a collaborative document editing app where team members can discuss via comments or an integrated chat. On mobile devices, when reviewing a document, a user might start writing multiple comments on different parts of the document concurrently. QuickScroll can allow the user to save each comment as a draft and scroll through them. The user has an unsent comment about Section 1 of the document and another about Section 2. With a gesture (perhaps a three-finger swipe, since two-finger might be used for scroll in a document viewer), the user brings up a list of comment drafts. Each is labeled by the section or content snippet. The user can tap a draft to jump to that part of the document and continue editing the comment. This embodiment shows QuickScroll functioning outside of a linear chat context—here each draft might be tied to a different location or context in a document, yet the concept of gestural multi-draft management remains beneficial.

Mobile CRM and Email Composition in CRM. In customer relationship management (CRM) mobile apps, users often compose notes or messages related to clients. These can range from formal emails to quick text messages, often under time pressure while on the go. QuickScroll can be adapted here to manage multiple note drafts. For instance, a salesperson might jot down a quick note to email a client later, then get a call and start writing a text message to another client, and also have a reminder note to themselves.

A CRM communication hub may be provided where QuickScroll has stored several unsent communications. The user might use an upward swipe gesture on a note field or even a hardware side button gesture (if available) to shuffle through unsent notes. The drafts could be across different communication channels (one might be an SMS, another an email draft), which QuickScroll can handle by storing the message type along with each draft. When retrieving, it opens the appropriate editor (email composer or text message interface) with that content. This demonstrates that QuickScroll's architecture is flexible: the draft manager 14 can interface with multiple message composition modules within an app. 4.

Other Applications. QuickScroll principles could extend to social media posting apps (e.g., drafting multiple tweets/posts and cycling through them), forum or Q&A platforms where a user might compose answers to multiple questions before posting, or even to code editors/IDE chat assistants where a developer might draft multiple queries or commands. The key unifying idea is providing a means to quickly suspend and resume multiple text entries via gestures, improving workflow.

Implementation Details

Hardware Requirements. The QuickScroll system does not require special hardware beyond a standard device capable of touch input. A multi-touch screen is preferred to distinguish single-finger vs multi-finger gestures. Haptic feedback hardware (vibration motor) can enhance the experience but is optional. If implementing on devices with other input means, gestures could be mapped accordingly (e.g., stylus gestures on a tablet, or even mouse gestures on a PC interface).

Software Integration. The invention can be implemented as part of the messaging application's code or as an overlay service. On Android, for instance, QuickScroll could be part of the app or conceivably a custom keyboard or accessibility service that intercepts input field gestures. Integrated implementation is preferred for smoother performance and security (draft content stays within the app's sandbox).

Data Structures. Drafts can be stored as simple objects containing text and metadata. If multimedia (images, etc.) is being composed, references to those attachments can also be saved in the draft object. The storage could use an SQLite database or in-memory data structure with periodic serialization to disk for persistence. Each draft might have fields like: id, conversation_id, timestamp_created, text_content, attachment_list, last_modified, status. The status might indicate if it's active, sent, etc.

Handling Special Cases. If the messaging app supports message types beyond plain text (voice notes, etc.), QuickScroll can either be limited to text-based drafts or extended to those (for example, recording an audio note but not sending it could be a "draft" that the user might want to resume or re-record—QuickScroll could list such items too). For simplicity, the primary embodiment focuses on text-based drafts. Security and Privacy: Draft content is typically user-private. If drafts sync to cloud, encryption should be applied. If the device is locked or the app is secured by a login, QuickScroll should honor those constraints (i.e., someone picking up the user's phone ideally shouldn't be able to see drafts without unlocking). QuickScroll can tie into the app's security model such that the overlay cannot be invoked when the app is in background or locked.

Performance Considerations. Managing multiple drafts is not computationally heavy, but UI fluidity is crucial. The gesture detection should be optimized not to interfere with normal scrolling in chat (for example, ensure that the downward swipe to save is distinguishable from just scrolling the conversation up). The overlay rendering should be lightweight—possibly using cached images or a simplified view for each draft preview to avoid rendering a full text editor for each entry in the list. Testing on various screen sizes ensures that even on small screens, the overlay is usable (perhaps limiting to show 3-4 drafts at a time with scrolling for more).

User Settings. Users might customize some aspects, such as enabling/disabling the feature, choosing which gesture triggers it, or how many drafts to keep (one might set a maximum to avoid clutter, e.g., auto-remove oldest draft if exceeding 10 drafts). QuickScroll can include preferences accessible through the app's settings. Example Workflow in Use (Preferred Embodiment):

To illustrate a cohesive use-case with alternate touch-screen gestures: Jane is texting her friend about plans for the weekend. In their chat, she starts writing a message asking about meeting time but halfway through she gets an idea to also suggest a gift for a mutual friend's birthday. Using QuickScroll, Jane swipes down on the text box, saving the half-written question as Draft 1. The input clears, and she types out her reminder about the gift. Before sending, she decides to also draft a message to another friend in a different chat. She swipes down again, saving the gift message as Draft 2 in the first chat. She switches to the other friend's conversation; QuickScroll shows a small "Draft" indicator on the first chat in her list. After drafting the other message, she returns to the first chat. She swipes up with two fingers, bringing up the overlay, which now shows two drafts (the question and the gift message). The overlay intelligently puts the question draft first because her friend had replied in the meantime with their availability (making Jane's question timely). Jane taps the question draft, it loads in the input, she finishes it and hits Send. That draft disappears from the overlay.

Later, QuickScroll might remind her of the gift message draft still unsent. This scenario demonstrates how QuickScroll helps manage multiple conversational threads and tasks seamlessly without losing any typed content. In conclusion, the QuickScroll system described in this detailed specification offers a powerful enhancement to messaging and similar communication interfaces. By leveraging gesture-based user inputs and providing a dedicated mechanism for handling multiple unsent drafts, it improves user control over the composition process. The above description of embodiments and alternatives is intended to be illustrative and not limiting; modifications and variations will be apparent to those skilled in the art without departing from the scope of the invention as defined in the appended claims.

Glossary of Claim Terms

Device Screen and User Interface (UI) refers to the combination of the physical display and the graphical user interface of the electronic device. The device screen is typically a touchscreen display panel that serves as both an output component (rendering visual elements for the user) and an input component (registering touch interactions) on a mobile or computing device. The UI (user interface) encompasses the layout and interactive visual components drawn on that screen—including elements such as conversation windows, message threads, text input fields, send buttons, and overlays or pop-up panels—through which the user engages with the messaging application. Hardware-wise, the screen includes the touch-sensitive surface and display hardware (e.g., an LCD/OLED panel) that detect user touches and present images, while the UI is the software layer that the device's processor drives to present and update those images, text, and controls according to the application's state. In the context of the QuickScroll system, the device screen and UI work together to facilitate gesture-based draft management without leaving the chat interface. For example, when a user performs a designated gesture on the touchscreen (part of the device screen hardware), the UI responds by invoking QuickScroll features: a swipe on the message input field might cause a draft overlay to be rendered on the display, or a long-press within the input area might bring up an interface for browsing saved drafts. The overlay itself is drawn on the device screen as a translucent panel above the normal chat UI, illustrating the interplay between the physical screen and the UI rendering logic. Thus, "Device Screen and UI" broadly covers both the physical touch-sensitive display and the software-presented interface elements on that display, collectively enabling the user's visual interaction with the messaging application.

Draft Manager refers to the software module or component responsible for creating, storing, retrieving, and deleting unsent message drafts within the messaging application. This module manages the lifecycle of draft messages: when the user initiates a save gesture, the Draft Manager captures the current content of the message composition field and saves it as a draft entry (often including metadata such as a conversation identifier, timestamp, and a unique draft ID or index). It maintains an organized repository or list of drafts for each conversation thread, allowing multiple drafts to be preserved simultaneously. The Draft Manager implements logic to add new drafts upon receiving a capture command, fetch and return stored draft content when the user wants to review or edit a draft, and remove drafts once they are sent or explicitly discarded by the user. In implementation, the Draft Manager interacts closely with the device's storage subsystems. It may utilize a local database or file storage (for example, storing drafts in an SQLite database table, or via an object persistence framework like CoreData on iOS) to persist draft messages between sessions. Each draft object can be stored in a structured format (including the message text and relevant metadata, potentially serialized as JSON for easy storage or transmission). The Draft Manager can also interface with cloud synchronization services if available—for instance, uploading draft data through a network interface to a cloud server so that drafts can be synced across multiple devices. In sum, the term "Draft Manager" encompasses any software component that handles draft message management functions within the client: it serves as the intermediary between user actions (gestures or commands to save/load drafts) and the underlying data storage and retrieval operations that ensure drafts are preserved and accessible when needed.

Draft Message Scrollable List Control is a user interface control configured to display multiple saved draft messages in a scrollable arrangement for browsing. This control is typically part of the draft overlay interface, presenting the user's unsent drafts as a list or stack that can be navigated by scrolling. Each draft appears as an entry (for example, a card or list item) within the control, often showing a preview of the draft's content (such as the beginning of the message text) and possibly additional details like a timestamp or a label. If only one draft exists, the control might display a single preview; if multiple drafts are present, it organizes them sequentially (e.g., in a vertical list or a horizontal carousel). The user can scroll through this list of drafts using touch gestures (swiping up/down or left/right) to reveal additional drafts beyond those initially in view. This scrollable list control is rendered by the messaging application's UI logic (for example, drawn as a translucent panel above the chat interface when invoked) and is powered by standard scrolling functionality. The gesture detection module works in tandem with this control: when the overlay is open, swipes on the draft list are interpreted as navigation commands to scroll to the next or previous draft. As the user scrolls, the control updates the display to bring the newly focused draft into view (centering it or highlighting it), providing a smooth browsing experience. The Draft Message Scrollable List Control also enables selection of a draft—for instance, the user can tap on a draft entry to load that draft into the message composition field for editing or sending. This term encompasses any similar GUI element that presents a scrollable list of draft messages, regardless of specific layout; whether it appears as a vertical scrolling list, a horizontal scrolling carousel, or any other scrollable format, if it allows the user to navigate through saved drafts by scrolling, it falls within the scope of a "Draft Message Scrollable List Control."

Draft Overlay is a temporary user interface component that displays one or more saved unsent message drafts on the screen, overlaid on top of the normal messaging interface. The draft overlay is typically invoked by a specific user action (such as a gesture or menu command) and appears as a pop-up panel, modal window, or translucent layer that floats above the chat conversation view. When active, it presents the content of saved drafts in a concise form (for example, showing a preview snippet of each draft message or a summary) so that the user can quickly review what has been saved. The overlay usually occupies a portion of the screen and may dim or blur the background interface to focus attention on the draft list. Within the QuickScroll system, the draft overlay serves as the browsing interface for drafts. Once triggered (for instance, by a long-press in the text input area or an upward swipe gesture), the overlay is generated by the UI rendering module and populated with the current drafts retrieved from the Draft Manager. Users can interact with the overlay by scrolling through the list of drafts (if multiple drafts are available) and selecting a desired draft to retrieve. Interaction is maintained while the overlay is open—for example, the user might swipe within the overlay to cycle through drafts or tap a particular draft entry to load it into the message composition box. The overlay is designed to be temporary and easily dismissible: after the user selects a draft or chooses to cancel (e.g., by tapping outside the overlay or pressing a close control), the overlay disappears, returning the interface to the normal chat view. In a patent context, "Draft Overlay" should be interpreted broadly to include any functionally equivalent interface element that presents stored unsent message content to the user on top of the existing UI for review or selection, regardless of the exact visual appearance or implementation (whether it's a full-screen modal, a drop-down panel, a floating card stack, etc.).

Electronic Device refers to any computing device or hardware platform capable of running the messaging application and the QuickScroll system. In the preferred embodiment, this is typically a mobile device such as a smartphone or tablet computer comprising standard hardware components: at least one processor (e.g., a mobile CPU or system-on-chip), system memory (RAM), persistent storage (flash memory or similar), a touchscreen display for input and output, and network interfaces (cellular radios, Wi-Fi, or other communication modules) enabling data connectivity for messaging. The electronic device provides the physical and operating environment in which the messaging software and draft management features operate. It includes the device's operating system (for example, iOS or Android) and any onboard firmware that together support application execution and hardware interaction. Within this invention, the electronic device is the platform hosting the messaging application integrated with QuickScroll functionality. For instance, in a representative architecture, the device's processor executes the messaging client and QuickScroll modules (gesture detection, draft manager, predictive ranking engine, etc.), the touchscreen serves as the input surface for detecting gestures and the output display for rendering the user interface (including message threads and draft overlays), and the persistent storage holds the application data such as saved drafts. The term "Electronic Device" encompasses not only smartphones and tablets but also any other client device that could implement the described methods— for example, a smart watch, laptop, or dedicated messaging appliance—as long as it contains the necessary hardware (processor, memory, input/output means) and software to support the messaging application and associated draft-saving features. It clearly distinguishes the physical device (and its inherent components) from the cloud or server side; the electronic device is the user's local device on which the messaging UI and QuickScroll features reside and execute.

Gesture Detection Module denotes the software component (potentially with associated firmware or hardware integration) that monitors and interprets touch input events to recognize specific gestures relevant to the QuickScroll functionality. This module interfaces with the device's touch input subsystem (the touchscreen sensor and OS touch event framework) to receive raw touch data, such as coordinates of touch points, movement trajectories, multi-touch contacts, and timings. It then applies recognition logic to identify when a user's touch behavior matches a predefined gesture pattern associated with draft management commands. For example, the Gesture Detection Module is configured to detect gestures like a downward swipe starting in the text input field (which signifies a "save draft" command), a long-press or long-hold in the text input area (which may signify an "open draft overlay" command), or a multi-finger upward swipe (another possible gesture to invoke draft browsing). It distinguishes these from ordinary touch interactions (such as tapping keys on the on-screen keyboard or scrolling through the conversation) by analyzing factors like the direction, speed, duration, and location of the touch. This module can be implemented using platform-specific gesture recognition APIs or libraries. For instance, it may leverage the operating system's gesture detection frameworks (such as an UIGestureRecognizer on iOS or Android's gesture detectors) to help identify complex gestures, or use custom algorithms running on the device's processor to filter and pattern-match the incoming touch events. The Gesture Detection Module essentially acts as the interpreter between the user's touch inputs and the higher-level QuickScroll actions: when it recognizes a valid QuickScroll gesture, it signals the appropriate function (for example, calling the Draft Manager to save a draft, or prompting the UI to display the draft overlay). The term "Gesture Detection Module" encompasses any software and/or firmware mechanism that performs this role of capturing raw input events and determining whether a defined gesture command (for controlling draft saving/retrieval) has been performed, thereby clearly delineating the gesture-based control logic in the system.

Gesture Input Field refers to the text input area of the messaging application's user interface that is enhanced to also serve as a zone for detecting user gestures related to QuickScroll operations. In a typical messaging UI, this field is the compose box where the user types outgoing messages (often a multi-line text box located at the bottom of a chat screen). Under the QuickScroll system, this same text box is augmented with gesture-recognition behavior: certain touch inputs made on or immediately around this field are not treated as regular text input or cursor movement, but instead are interpreted as special commands (for example, saving the current text as a draft or invoking the draft overlay). Thus, the gesture input field still functions as a normal message composition box (accepting keyboard input, displaying the typed characters, and allowing editing of message text), but it has an additional layer of interactivity. For instance, a swipe gesture performed starting within this field (as opposed to a simple tap or typing action) might be captured by the gesture detection module and recognized as the "save draft" gesture, triggering the system to store the field's content as a draft and clear the field. Likewise, a long-press on this field could be reserved to trigger retrieval mode (opening the draft overlay) rather than producing a context menu or text selection as it normally might. The implementation may involve attaching specialized gesture recognizers or event listeners to the text box UI element so that these gestures can be caught. The term "Gesture Input Field" encompasses not just the visible text box control itself, but also the integrated gesture-sensing functionality associated with it in this invention. In other words, it is the message composition field as adapted to recognize Quick-Scroll gestures (like downward swipes or long touches) in addition to its standard role, enabling the dual functionality of text entry and gesture command input.

Gesture-based Retrieval (also referred to as a retrieval gesture) denotes a specific user action or gesture that triggers the system to retrieve saved drafts and present them to the user. It is essentially the gesture command for entering a draft-browsing mode. For example, in the QuickScroll implementation, a particular upward swipe gesture (such as a two-finger swipe upward on the text input area, or a long-press followed by a swipe) could serve as the gesture-based retrieval—upon recognizing this input, the application would display the draft overlay containing the list of saved drafts. Alternatively, a different gesture like a dedicated long-press on the input field alone might be configured to open the draft list. The key aspect is that the user performs a deliberate touch gesture that the system interprets as a signal to fetch and show unsent message drafts, as opposed to other interactions. Once the gesture-based retrieval is recognized by the gesture detection module, the system transitions into a draft retrieval or browse state. Typically, this means the UI will overlay the saved drafts (using a component such as the Draft Overlay) so the user can see and select from them. The gesture itself is designed to be intuitive and not easily confused with normal navigation or typing; for instance, a long-press or an upward swipe in the input region is not something that would occur during ordinary message composition, thus it serves well as a unique trigger. Gesture-based retrieval is the counterpart to the gesture-based saving action: where the saving gesture stores the current message, the retrieval gesture reveals stored messages. The term should be understood broadly to include any user input action (primarily touch gestures in the preferred embodiment, but potentially also other inputs like a specific hardware button combination or voice command in alternate embodiments) that signals the application to present one or more saved drafts for user review or selection.

Gesture-based Saving Action (also referred to as a save gesture) means a defined user gesture that the system interprets as a command to capture the current message composition as a draft. Instead of tapping a "save" button or relying on an automatic save, the user intentionally performs a gesture on the touchscreen that tells the application to store the unsent message text. In the context of QuickScroll, a prime example of a gesture-based saving action is a downward swipe across the message input field: when the user swipes their finger downward (toward the bottom edge of the screen) starting in the text box area containing an unsent message, the system detects this gesture and responds by saving the content of that text box into the draft storage. Other embodiments could use different gestures for the save command—for instance, a two-finger tap on the input field, a pinch-in gesture, or even a specific tilt motion if the device has sensors—but the essential concept is that a user's deliberate gestural input triggers the saving mechanism. Upon recognition of the save gesture, the application's draft management logic (the Draft Manager) creates or updates a draft entry with the current text (and any other associated data like attachments or metadata), then typically provides feedback such as clearing the text box (since the content was saved away) or showing a brief confirmation (like a "Draft saved" overlay or haptic feedback). The use of a gesture-based action streamlines the saving process, making it quick and unobtrusive, integrated directly into the interaction with the text field. Notably, the term "Gesture-based Saving Action" is not limited to the specific swipe gesture example; it encompasses any user input action that serves this purpose of instructing the system to save the message. This could include a voice command ("save draft"), a hardware key press (if a device had a dedicated button), or other intuitive gestures configured for saving. What defines it is the role—a non-conventional input (as opposed to simply sending or deleting text) that the system recognizes as the signal to preserve the ongoing message as a retrievable draft.

Messaging Application refers to the client software on the electronic device that enables users to compose, send, receive, and view messages in a conversational interface. Examples of messaging applications include SMS/text messaging apps, instant messaging or chat applications, and similar communication software (such as those for chat services or social messaging platforms). This application provides the user interface for the conversation threads (displaying sent and received messages), the text box for composing new messages, and controls like the send button. It also handles the underlying functions of messaging, such as connecting to a server or network to transmit messages and retrieving incoming messages. In this invention, the messaging application is enhanced or supplemented with the QuickScroll functionality for draft management. The QuickScroll features can be integrated into the messaging app's codebase or provided as an add-on module, but in either case, the messaging application remains the primary context in which drafts are created and used. It manages the conversation context (so each draft can be associated with the correct chat or recipient) and works with the device's operating system for input (touch events, keyboard input) and output (display updates, notifications). Typically, the messaging application will have data storage for messages and drafts—for example, it might use a local database (such as SQLite or CoreData) to store chat history and unsent drafts—and networking logic to sync messages with a backend service or send them via protocols like SMS, XMPP, or HTTP requests to a cloud chat server. The term "Messaging Application" thus encompasses any software application on the user's device that provides messaging functionality and within which the described draft-saving and retrieval techniques are implemented. It could be a standalone dedicated messaging app or a module of a larger application suite, as long as it presents a user interface for messaging and incorporates the ability to save and manage unsent message drafts as described.

Predictive Ranking Engine refers to a software component or service that automatically evaluates and ranks saved message drafts based on various contextual factors and predefined criteria to determine their relative priority or relevance. This engine acts as an intelligent helper within the QuickScroll system: whenever multiple draft messages exist, it analyzes data points such as the time each draft was saved or last modified, the activity in the corresponding conversation (e.g., whether the recipient has since replied or if the conversation has been idle), the content of the drafts (looking for indicators of urgency or importance, like question marks or urgent keywords), and potentially user behavior patterns (for instance, which drafts the user tends to return to frequently). Using these inputs, the Predictive Ranking Engine computes a priority score or ordering for the drafts. In practice, the engine might implement its logic via heuristic rules or machine learning algorithms. For example, a rule-based approach might always rank the most recently edited draft highest, or highlight a draft if the recipient is currently online or has sent a new message relevant to that draft's context. A machine learning approach could learn from the user's past interactions to predict which draft the user is most likely to need next. Once the ranking or suggestion is computed, the engine provides this information to the UI layer (via the Draft Manager or directly) to influence how drafts are presented in the overlay—for instance, sorting the scrollable list of drafts so that the most likely relevant draft is at the top or visually emphasizing one draft card (with a highlight or different styling) to draw the user's attention. The term "Predictive Ranking Engine" encompasses any such subsystem that performs this analytical ranking function, whether it is a distinct module or part of the draft management logic, and regardless of the specific algorithms used. Its role is to enhance usability by intelligently ordering or suggesting drafts to the user, helping ensure that important unsent messages are noticed and addressed promptly.

Predictive Ranking Logic refers to the underlying algorithms, rules, or computational strategies used to assess and prioritize unsent message drafts according to their likely relevance or importance. It is essentially the logic or methodology that the Predictive Ranking Engine employs to make its determinations. This logic can be embodied in code as a set of heuristic conditions (for example, "if a draft's conversation has unread incoming messages, increase its priority") or as a more complex model (such as a machine learning model trained to predict which draft the user is likely to select). The predictive ranking logic takes into account various attributes of each draft (timestamps, content, associated chat activity, etc.) and possibly external context (like whether the recipient is currently active) to output an ordered list or a scored list of drafts. This logic may be implemented as part of the Draft Manager or as a separate function or module dedicated to analytics. It could involve, for instance, sorting drafts by a weighted combination of factors: recency (how long ago the draft was saved), urgency (as inferred from words in the text or the presence of a question), and context (such as whether the conversation has seen recent replies). It might also continuously update or recalculate when conditions change (like when a new message arrives from the contact, or after a certain time interval passes). The term "Predictive Ranking Logic" covers approaches that achieves the function of dynamically evaluating drafts to suggest an order of importance. Whether the implementation is a simple priority queue updated by rules, an AI algorithm that learns user priorities, or any combination thereof, if it serves to analyze draft-related data to influence which drafts are presented first or highlighted to the user, it falls within this definition. Predictive Ranking Logic is the decision-making brain behind the scenes that guides the user's attention to the draft messages that likely merit prompt action.

Processor refers to the central processing unit (CPU) or an equivalent processing circuitry within the electronic device that executes instructions and carries out the operations of the messaging application and the QuickScroll system. This hardware component is the computational engine of the device—for example, in a smartphone it may be a multi-core system-on-chip that includes general-purpose CPU cores (and possibly specialized co-processors). The processor is responsible for running the software modules such as the gesture detection module, draft manager, predictive ranking engine, and the messaging application's user interface logic. It performs the necessary computations to detect gestures from raw touch data, to save and retrieve drafts (manipulating data in memory and storage), to render the overlay and other UI components, and to implement any predictive algorithms for ranking drafts. In essence, whenever the user interacts with the device (by typing, performing a gesture, etc.), the processor is the component that processes those inputs (via the operating system and application software) and generates the appropriate responses (update the display, store data, send network messages). It operates in conjunction with memory (storing runtime variables and program code) and other hardware, but the term "Processor" in this context emphasizes the hardware execution unit(s) that run the draft management methods. In claim terminology, a "processor" may encompass a single processing unit or multiple cooperating processors that together handle the tasks. It is understood to cover any programmable processing device capable of running the instructions—whether it's a main CPU, a microcontroller, a digital signal processor, or a core of a system-on-chip—that is configured (by software) to carry out the QuickScroll features as described. This distinguishes the processing hardware from the software logic itself: the processor provides the capability to execute the software that implements all aforementioned modules and functions in the draft management system.

Scroll Means encompasses any hardware or software mechanism that enables a user to navigate through a list of saved drafts on the user interface. In the context of this invention, the primary scroll means is typically the touch-based gesture on the touchscreen (for instance, swiping up or down on the draft overlay to scroll through draft entries). However, the term is defined broadly to include equivalent structures or methods for scrolling. This can include using physical buttons or keys (such as arrow keys or a directional pad on a keyboard) to move a selection up or down the list of drafts, a scroll wheel or trackball if the device has one, or any other input method that achieves the function of traversing through multiple draft items. Even voice commands or tilt sensors could constitute a scroll means if they are configured such that, for example, saying "next draft" or tilting the device causes the list of drafts to scroll accordingly. In practical terms, the scroll means provides the user with control to sequentially access each draft in the scrollable list. From an implementation perspective, when the user utilizes the scroll means (be it a gesture or another mechanism), the system responds by shifting the view of the draft list to bring different draft entries into focus or into view. In the preferred embodiment, the gesture detection module and UI renderer together form the scroll means: the gesture module interprets a swipe gesture as a scroll command and the UI component then animates the list to show the next drafts. If interpreted as a means-plus-function term in a patent sense, the disclosed structure supporting this function would include such elements (the touch-sensing hardware and the software that moves the overlay list). The important point is that "Scroll Means" is not limited to touchscreen gestures alone but covers any interface control or method that allows the user to move through the saved drafts in order, fulfilling the function of scrolling through the draft collection.

Scrollable List of Drafts refers to an arrangement of multiple unsent message drafts presented in the user interface such that the user can navigate through the list by scrolling. It highlights that the drafts are laid out sequentially (one after the other, either vertically in a column or horizontally in a row or carousel) rather than all being shown at once in separate areas. Because they may not all fit on the screen at the same time, the interface allows the list to be moved (scrolled) to bring different draft entries into view. In the QuickScroll UI, the draft overlay embodies a scrollable list of drafts: once invoked, it shows the user's drafts stacked, for example, vertically, with perhaps only the top few visible initially, and the user can swipe to reveal additional drafts. Each draft in the scrollable list is typically represented by a concise UI element—it might show the first line of the draft text, a timestamp, or other summary information, possibly formatted like a message bubble or a card. The user can scroll through them using the scroll means (such as swiping gestures or other navigation inputs), and as they do so, the list moves up or down (or sideways for a carousel layout) to expose drafts that were off-screen. The scrollable nature of the list implies smooth continuous navigation, so intermediate positions can be viewed as well, not just jumping item by item. This term is essentially another way to describe the core of the draft overlay's content: it is a list containing all the saved draft messages, presented in a manner that supports scrolling. Any interface construct where drafts are arranged sequentially with the ability to move the viewport through that sequence falls under "Scrollable List of Drafts"—whether implemented as a standard list view, a series of cards in a swipeable stack, or any equivalent scrolling container. The emphasis is on the functional aspect: multiple draft items are accessible in one place via a scroll action, as opposed to, say, a static single draft display.

Send Control Button refers to the user interface element that initiates the sending of a composed message in the messaging application. This is typically presented as a button or icon adjacent to the message composition field (often depicted as a paper airplane icon, arrow, or labeled "Send"), which the user taps or clicks to transmit the current message text to the intended recipient. The send control button is a software control displayed on the device's touchscreen (or, in some cases, could be a physical button or keyboard key mapped to sending, depending on the device), and it is tied to the messaging application's sending function: activating it will cause the application to package the content of the text box (and any attachments) and send it through the appropriate messaging service or network. In the QuickScroll-enhanced messaging interface, the send control button remains the standard mechanism for dispatching messages once the user is ready to send. For instance, after retrieving a draft via the draft overlay and making any desired edits, the user would press the send button to actually deliver that message to the recipient. The presence of gesture-based draft saving does not remove or replace the send button; rather, it complements it by giving the user an additional option to save a message instead of sending. The term "Send Control Button" thus includes any graphical or physical control that performs this sending action. This could encompass a touchscreen button within the app UI, a keyboard's enter key if configured to send messages (as is sometimes the case in chat apps), or any similar actuator. However, in most mobile messaging embodiments, it specifically means the on-screen send icon the user presses. In patent terms, it's understood broadly as the means by which the user instructs the application to transmit the currently entered message, clearly distinguishing it from the gestures which have different functions (like saving drafts or scrolling).

Status of Chat Recipient refers to information indicating the current state or availability of the person on the other end of a messaging conversation, as provided by the messaging system. This status can include indicators such as whether the recipient is online or offline, active or idle, typing a message, or the last time they were seen active in the chat. Many messaging applications display a recipient's status in the conversation view or the contacts list (for example, showing "Online now," "Last seen 5 minutes ago," or a small colored dot indicating presence). The status might also encompass read receipts (whether the recipient has read the last message) or delivery status, although those are more about message state; typically, "status of chat recipient" focuses on the recipient's availability or activity state. In the context of this invention, the status of the chat recipient may be a factor considered by the system's logic (such as the predictive ranking engine) when managing drafts. For instance, if the recipient is currently active or has just come online, a draft intended for that recipient might be deemed higher priority to remind the user to send it while the recipient is available. Conversely, if the recipient is offline or away, the user might not be in a rush to send the draft. The application obtains the recipient's status via the messaging service's protocols (for example, presence information from a server) and typically updates it in real-time. This status can be displayed in the UI (like a subtitle under the contact name saying "Online" or showing a "typing . . . " indicator when they are composing a reply). The term "Status of chat recipient" is meant to cover any such presence or state information that the messaging app can access and present regarding the other party in the chat. It clearly pertains to the other participant's status, not the message itself, and it can be used both for user information and as contextual data for features like draft prioritization or notifications.

Storage in this context refers to the data storage systems and media that hold the messaging data, particularly unsent draft messages, on the electronic device (and optionally in the cloud). It includes both the physical storage hardware (such as the device's internal flash memory, SSD, or other non-volatile memory where data is saved) and the software layer that manages data persistence (file systems, databases, and synchronization services). In the QuickScroll system, when a draft is saved, it is written to storage so that it remains available even if the app is closed or the device is restarted. For example, the drafts might be stored in a local SQLite database or a similar structured storage format, with each draft record containing fields for the message content and associated metadata (conversation ID, timestamps, etc.). On iOS, a developer might implement this using CoreData (an object persistence framework) or by writing to a plist/JSON file, whereas on other platforms they might use direct database calls or key-value storage—all of these would constitute "storage" for the purposes of this term. Storage is not limited to on-device memory; it can also extend to remote storage through cloud sync. If the messaging application supports cloud backup or multi-device sync, the draft data could be serialized (for instance, into JSON or another transferable format) and sent over the network to a server or cloud service, so that the drafts are saved in the user's account and can be retrieved on another device. In that scenario, the local storage still holds a copy, and a synchronization protocol ensures consistency between local and cloud storage. The term "Storage" covers any repository or mechanism where the draft information is kept: this includes the low-level hardware memory, the databases or files on top of that hardware, and any remote database or server that holds the data. It is understood to encompass both the act of storing (as in writing data) and the medium of storage. By clearly defining "Storage," we distinguish it from transient memory (like RAM used during runtime)—here we are concerned with persistent or semi-persistent retention of data such as unsent drafts, so that they remain available until intentionally deleted or transmitted.

Temporary Message Composition means any message content that a user has entered into a message composition interface but not yet finalized or sent. It highlights the transient, in-progress nature of the message: at the moment, it exists only locally in the compose box or draft storage and has not been transmitted to any recipient. In everyday terms, this is an unsent draft message in its initial state (for example, text typed into the chat input field that the user hasn't hit "send" on yet, or perhaps hasn't even saved as a named draft). The word "temporary" underscores that the content is subject to change—the user might still be editing it, might decide to send it as is, or might abandon it. In the QuickScroll system, capturing a temporary message composition is a core operation: when the user performs the save gesture, the current temporary composition (whatever text is in the text box at that time) becomes an "unsent message draft" stored by the system. If the user continues typing without sending, that text remains a temporary composition until either sent or saved. The term is useful to generalize beyond just one specific scenario—it can apply to any message in any messaging or composition interface that hasn't been finalized. For instance, in a broader sense it could include a partially written email or social media post, but in the context of this application it refers specifically to chat message text in the messaging app's input field prior to sending. By defining "Temporary Message Composition," the patent can refer to this concept in claims to cover the content that is being manipulated (saved, retrieved, etc.) without limiting it to a particular stage (i.e., whether it's currently just in the input field or already stored as a draft). Essentially, as long as the message content is not yet sent out from the device, it qualifies as a temporary message composition. This term therefore covers both the live content in the UI being edited and any equivalently unsent content that might be in a holding state (like a saved draft waiting to be reloaded).

Text Box for Transmitting Messages refers to the GUI element in the messaging application where the user types the message that they intend to send. It is the text input field (often at the bottom of a chat window) dedicated to composing outgoing messages. When the user finishes writing and activates the send action (such as pressing the send button), the content of this text box is then transmitted through the messaging service to the recipient. The text box typically supports multi-line input, allows the user to see and edit their message before sending, and may show placeholder text when empty (e.g., "Type a message . . . "). It's an interactive control, usually implemented by the platform's user interface framework (for example, an <input> or <textarea> element in a web-based app, an EditText in Android, or a UITextView in iOS), capable of receiving keyboard input and displaying the typed characters. In relation to QuickScroll, the text box for transmitting messages is the same element that doubles as the gesture input field for saving drafts. Under normal operation, text entered into this box is either sent or remains there until sent or cleared. QuickScroll adds the ability to swipe or otherwise gesture on this box to save its contents as a draft (instead of transmitting them immediately). After such a save, the box is typically cleared to allow new input. The term "Text Box for Transmitting Messages" emphasizes the primary function of this component: it holds the message text that will eventually be sent out. It distinguishes this from other text boxes or fields that might be in the app (for example, search boxes or login fields). In any claim or description, referring to this text box makes it clear we mean the message compose field. It encompasses any variant of such an input field used for message composition, regardless of platform or exact UI design. Whether it's a single-line field with an expanding feature, a fixed multi-line panel, or any similar control, as long as its purpose is to accept user-entered text for eventual transmission in a conversation, it falls under "Text Box for Transmitting Messages."

Touchscreen Gesture refers to any deliberate movement or touch pattern made by a user on a touch-sensitive screen that the system recognizes as a specific input command beyond a simple tap. Common examples of touchscreen gestures include swiping (dragging a finger across the screen in a certain direction), pinching or spreading two fingers (for zooming), long-pressing (touching and holding in place for a duration), and multi-finger swipes or rotations. Such gestures are detected by tracking the coordinates and changes of one or more touch points on the device's touchscreen and interpreting those changes according to predefined patterns. Modern touchscreen devices and their operating systems provide the capability to detect these gestures through software recognizers that translate raw touch data into higher-level events (like "swipe left" or "pinch open"). In the context of this messaging invention, specific touchscreen gestures are defined to control draft-saving features. For instance, a downward swipe on the message input area is defined as a gesture to save the current message as a draft, and a certain upward swipe or long-press might be defined to retrieve saved drafts. These gestures differ from the standard taps and typing interactions the app normally expects, thus the system (via the gesture detection module) listens for them and triggers special behaviors when they occur. The term "Touchscreen Gesture" encompasses any such user action performed on the touch interface—including but not limited to the ones used for QuickScroll—and is used to generalize the concept of gesture-based inputs. It emphasizes that the input is performed on a touch screen (as opposed to a physical button press or voice command). Whether a gesture involves one finger or multiple, is linear or multi-directional, or is custom-defined for a particular app, if the user's finger movements on the touchscreen are being interpreted as a unique command, that is a touchscreen gesture. This broad definition covers all gestures relevant in this document and would include any new gestures that might be configured for similar purposes.

Unsent Message Draft refers to a message (or message content) that has been composed by the user but not yet sent to the intended recipient, and which has been saved by the system for potential later use. It is essentially a preserved snapshot of a temporary message composition that the user wanted to keep for future sending or editing. In practical terms, an unsent message draft contains the text (and possibly other elements like emojis or attached media references) that the user had entered, as well as metadata linking it to the conversation or recipient it was meant for, and usually a timestamp of when it was saved. It remains stored within the device (and possibly synced to an account) until the user either sends that message or explicitly deletes the draft. Under the QuickScroll mechanism, when the user performs the save gesture, the content in the text box becomes an "unsent message draft" stored via the Draft Manager. Multiple unsent message drafts can exist concurrently, even within the same chat thread. For example, a user might have three different unsent drafts in a single conversation, each captured at different times. These drafts are not visible to the recipient (since they haven't been sent over the network)—they exist only on the user's side as pending content. The system allows the user to retrieve any of these drafts back into the compose box to continue editing or to send it when ready. The term "Unsent Message Draft" therefore identifies the fundamental data object that this entire feature manages: a message that is written but not transmitted. It draws a clear line between messages that have been sent (which become part of the conversation history and are delivered to the other party) and those that are unsent (which remain local and editable). In patent terms, it covers any stored composition that hasn't been sent, regardless of how it is stored or represented internally (text string, data record, etc.), including drafts that might include other content types or metadata. So long as a message is saved for later and not yet delivered, it qualifies as an unsent message draft.

Each of the above terms is intended to clarify the meaning of language that may be used in the claims of any patent application for this invention. These definitions are provided to ensure that the terms are interpreted consistently with the description provided herein and to avoid ambiguity. They are not meant to limit the scope of the invention but rather to explain the terminology in the context of this specification and the anticipated claims.

What is claimed is:

1. A method for managing unsent message drafts in a messaging application, comprising:
   a. detecting a first user gesture comprising a single-finger swipe up on a text input field of a message composition interface of the messaging application;
   b. in response to detecting the first user gesture, saving currently composed unsent message content as a draft message in a local memory associated with the messaging application together with metadata including a conversation identifier of the message composition interface and clearing the message composition interface;
   c. detecting a second user gesture comprising a long-press on the text input field distinct from the first user gesture;
   d. in response to detecting the second user gesture, displaying an overlay interface within the messaging application, the overlay interface presenting a plurality of saved draft messages in a vertically scrollable list arranged in a stacked, semi-cylindrical layout, wherein ordering of the saved draft messages is determined by a predictive ranking engine that evaluates at least draft-recency, per-draft access frequency, and activity in the associated conversation thread;
   e. detecting a user selection of one of the saved draft messages from the overlay interface;
   f. in response to the user selection, populating the message composition interface of the same conversation thread identified in the metadata with content of the selected draft message; and
   g. automatically dismissing the overlay interface after populating the message composition interface with the content of the selected draft message.

2. The method of claim 1, wherein the first user gesture comprises a single finger swipe up on the text input field of the message composition interface.

3. The method of claim 1, wherein the second user gesture comprises a long-press touch input on the message composition interface distinct from the first user gesture that invokes the overlay interface displaying the saved draft messages.

4. The method of claim 1, wherein saving the currently composed unsent message content as the draft message comprises storing the message content as a data record in a local database of the messaging application in association with a conversation identifier of an active conversation thread.

5. The method of claim 1, wherein the overlay interface comprises a scrollable list display that presents each saved draft message as a preview entry overlaying a conversation view of the messaging application.

6. The method of claim 5, wherein the overlay interface is arranged in a compact, stacked, semi-cylindrical layout to enable vertical scrolling and navigation through the saved draft messages.

7. The method of claim 1, further comprising providing user interface controls within the overlay interface for managing the saved draft messages, including adding a new draft message, deleting an existing draft message, or reordering the draft messages in the list.

8. The method of claim 1, further comprising prioritizing the presentation order of the saved draft messages in the overlay interface based on at least two of draft recency, per-draft access frequency, and activity in the associated conversation thread using a predictive ranking engine.

9. The method of claim 1, wherein each saved draft message is linked to a specific conversation thread in the messaging application, such that retrieving the draft message via the overlay interface inserts the draft message into the message composition interface for the same conversation thread in which it was originally composed.

10. The method of claim 1, further comprising synchronizing the saved draft messages to a remote storage service or server such that the draft messages are accessible for retrieval across multiple user devices running the messaging application.

11. A non-transitory computer-readable medium storing program instructions that, when executed by one or more processors of a mobile device running a messaging application, cause the mobile device to perform a method comprising:
   a. detecting a first user gesture comprising a single-finger swipe up on a text input field of a message composition interface of the messaging application;
   b. in response to the first user gesture, saving currently composed unsent message content as a draft message in a memory of the mobile device together with metadata including a conversation identifier of the message composition interface and clearing the message composition interface;
   c. detecting a second user gesture comprising a long-press on the text input field distinct from the first user gesture;
   d. in response to the second user gesture, displaying an overlay interface within the messaging application overlaid on a conversation view, the overlay interface presenting multiple saved draft messages as a vertically scrollable list in a stacked, semi-cylindrical layout, wherein ordering of the saved draft messages is determined by a predictive ranking engine that evaluates at least draft-recency, per-draft access frequency, and activity in the associated conversation thread;
   e. detecting a user selection of one of the saved draft messages from the overlay interface;

f. in response to the user selection, populating the message composition interface of the same conversation thread identified in the metadata with content of the selected draft message; and g. automatically dismissing the overlay interface after the selected draft message has been inserted into the message composition interface.

12. The non-transitory computer-readable medium of claim 11, wherein the first user gesture comprises a single-finger swipe up on the text input field of the message composition interface.

13. The non-transitory computer-readable medium of claim 11, wherein the second user gesture comprises a long-press touch input distinct from the first user gesture on the message composition interface that triggers display of the overlay interface with the saved draft messages.

14. The non-transitory computer-readable medium of claim 11, wherein the program instructions for saving the unsent message content as the draft message include instructions for writing the message content and associated metadata including a conversation identifier to a local database or data store maintained by the messaging application.

15. The non-transitory computer-readable medium of claim 11, wherein the overlay interface presented in response to the second user gesture comprises a scrollable list of draft message previews overlaid on a conversation view of the messaging application.

16. The non-transitory computer-readable medium of claim 15, wherein the overlay interface is rendered in a stacked, semi-cylindrical scrolling layout to allow navigation through multiple saved draft messages using vertical swipe gestures.

17. The non-transitory computer-readable medium of claim 11, wherein the program instructions further cause the mobile device to provide interactive controls within the overlay interface to allow a user to add a new draft message entry, delete a selected draft message, or reorder the saved draft messages.

18. The non-transitory computer-readable medium of claim 11, wherein the program instructions further cause the mobile device to automatically arrange or highlight the saved draft messages within the overlay interface based on the predictive ranking engine of claim 11 that evaluates draft-recency, per-draft access frequency, and activity in the associated conversation thread.

19. The non-transitory computer-readable medium of claim 11, wherein the program instructions for saving the draft message include associating the draft message with a conversation identifier corresponding to an active chat thread, such that the draft message is retrievable in context and is restored to the message composition interface of the same chat thread upon selection from the overlay interface.

20. A method for gesture-based capture and retrieval of multiple unsent draft messages in a mobile messaging interface, comprising:

a. detecting a first user gesture comprising a single-finger swipe up on a text input field of a messaging application's user interface;

b. in response to the first user gesture, storing currently entered text from the text input field as a draft message in a local draft repository associated with an active conversation thread, and then clearing the text input field to an empty state;

c. detecting a second user gesture comprising a long-press on the text input field;

d. in response to the second user gesture, displaying a draft management overlay interface within the messaging application, the overlay interface presenting a vertically scrollable list of multiple saved draft messages in a stacked, semi cylindrical layout and ordered by a predictive ranking engine that evaluates at least draft-recency, per-draft access frequency, and activity in the associated conversation thread;

e. detecting a user selection of one of the saved draft messages from the draft management overlay interface;

f. in response to the user selection, populating the text input field with content of the selected draft message;

g. automatically dismissing the draft management overlay interface after populating the text input field with the selected draft message; and h. wherein the draft management overlay interface includes user interface controls operable to add or remove draft messages and to reorder the list of saved draft messages, and wherein the saved draft messages in the overlay interface are displayed in an order determined at least in part by a priority ranking that accounts for recency of draft modification or predicted relevance of the draft messages.

21. A method for managing unsent draft communications in a digital communication interface, comprising:

a. detecting a first user gesture comprising a single-finger swipe up on a composition input area;

b. in response to the first user gesture, saving currently composed content from the composition input area as a draft communication in a storage associated with the communication interface together with metadata including a conversation identifier, and clearing the composition input area for new input;

c. detecting a second user gesture comprising a long-press on the composition input area distinct from the first user gesture;

d. in response to the second user gesture, displaying an overlay interface within the digital communication interface, the overlay interface presenting multiple saved draft communications as a vertically scrollable list in a stacked, semi-cylindrical layout ordered by a predictive ranking engine that evaluates at least draft-recency, per-draft access frequency, and activity in the associated conversation;

e. detecting a user selection of a draft communication presented in the overlay interface; and f. in response to the user selection, inserting content of the selected draft communication into the composition input area of the communication interface for the same conversation in which it was originally composed.

22. The method of claim 21, wherein the digital communication interface is part of a customer relationship management (CRM) platform, and the unsent draft communications comprise draft messages or notes associated with a customer record within the CRM platform.

23. The method of claim 21, wherein the digital communication interface is a collaborative editing or team messaging platform, and the unsent draft communications comprise draft comment messages or chat messages associated with a shared document or group channel in the collaborative platform.

24. The method of claim 21, wherein at least one unsent draft communication comprises non-text content selected from an audio voice note or an image attachment and saving the composed content as the draft communication comprises capturing and storing the non-text content such that the overlay interface presents a representation of the non-text content for later retrieval and insertion.

25. The method of claim 21, further comprising synchronizing the saved draft communications to a remote server or cloud-based storage such that the draft communications are available for retrieval on multiple client devices or platforms that access the digital communication interface.

26. The method of claim 21, wherein the first user gesture is the single finger swipe up on the composition input area, and wherein the second user gesture is a long-press that invokes the overlay interface.

27. The method of claim 21, wherein the overlay interface aggregates draft communications from a plurality of different conversation threads or contexts within the communication interface and visually groups the draft communications by their respective conversation or context to facilitate navigation among drafts.

28. The method of claim 21, further comprising displaying an indicator in a conversation list or other user interface element associated with a conversation or channel to denote that one or more unsent draft communications are stored for that conversation or channel.

29. The method of claim 21, wherein at least one saved draft communication is associated with a scheduled event or reminder in the digital communication interface, and the method further comprises automatically surfacing or highlighting the associated draft communication in the overlay interface when a time associated with the scheduled event is reached.

30. The method of claim 21, wherein a draft communication saved in a first conversation context within the communication interface is made available for insertion into a second, different conversation context via the overlay interface, thereby allowing transfer of draft content between distinct conversations or channels.

* * * * *